(12) United States Patent
Urbanek

(10) Patent No.: US 9,743,271 B2
(45) Date of Patent: Aug. 22, 2017

(54) DELIVERY OF BRANDING CONTENT AND CUSTOMIZATIONS TO A MOBILE COMMUNICATION DEVICE

(71) Applicant: Sprint Communications Company L.P., Overland Park, KS (US)

(72) Inventor: Robert E. Urbanek, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 158 days.

(21) Appl. No.: 14/060,712

(22) Filed: Oct. 23, 2013

(65) Prior Publication Data

US 2015/0111564 A1 Apr. 23, 2015

(51) Int. Cl.
*G06F 15/177* (2006.01)
*H04W 8/20* (2009.01)

(52) U.S. Cl.
CPC .................................... *H04W 8/20* (2013.01)

(58) Field of Classification Search
CPC ......... H04W 8/18; H04W 8/20; H04W 8/205; H04L 41/08; H04L 41/0803; H04L 41/0806; H04L 41/0816; H04L 41/0886; H04L 41/0889
See application file for complete search history.

(56) References Cited

U.S. PATENT DOCUMENTS

| | | | |
|---|---|---|---|
| 6,131,024 A | 10/2000 | Boltz | |
| 6,445,914 B1 | 9/2002 | Findikli et al. | |
| 6,753,887 B2 | 6/2004 | Carolan et al. | |
| 7,027,773 B1 | 4/2006 | McMillin | |
| 7,165,191 B1 | 1/2007 | Vakrat | |
| 7,260,382 B1 | 8/2007 | Lamb et al. | |
| 7,266,371 B1 | 9/2007 | Amin et al. | |
| 7,409,208 B1 | 8/2008 | Clare et al. | |
| 7,493,111 B2 | 2/2009 | Knowles | |
| 7,530,079 B2 | 5/2009 | Stubbs et al. | |
| 7,817,988 B2 | 10/2010 | Kruis et al. | |

(Continued)

FOREIGN PATENT DOCUMENTS

| | | | |
|---|---|---|---|
| EP | 2079256 A1 | 7/2009 | |
| EP | 2461613 A1 | 6/2012 | |

(Continued)

OTHER PUBLICATIONS

First Action Interview Office Action dated Jun. 16, 2014, U.S. Appl. No. 13/763,443, filed Feb. 8, 2013.

(Continued)

*Primary Examiner* — Jonathan Bui

(57) ABSTRACT

Embodiments of the disclosure are directed to methods and systems for provisioning and/or customizing a mobile device. After a mobile device is purchased by a user, custom settings and information (or customization content) may be delivered to or accessed on the mobile device. In some embodiments, the customization content may be pre-loaded onto the device and access via a uniform resource identifier (or URI) string. In other embodiments, the customization content may be accessed from a remotely hosted location via a uniform resource locator (or URL) string. Additionally, customization content may be accessed via a combination of the above methods.

15 Claims, 7 Drawing Sheets

(56) References Cited

U.S. PATENT DOCUMENTS

| | | |
|---|---|---|
| 7,904,895 B1 | 3/2011 | Cassapakis et al. |
| 7,991,988 B2 | 8/2011 | Chen |
| 8,107,926 B2 | 1/2012 | Goto |
| 8,185,097 B2 | 5/2012 | Vanderlinden et al. |
| 8,185,101 B1 | 5/2012 | Wiseman et al. |
| 8,249,654 B1 | 8/2012 | Zhu |
| 8,260,281 B2 | 9/2012 | Urbanek |
| 8,401,538 B2 | 3/2013 | Urbanek |
| 8,401,595 B2 | 3/2013 | Zhu et al. |
| 8,433,953 B1 | 4/2013 | Gaudette et al. |
| 8,442,521 B2 | 5/2013 | Fleischman et al. |
| 8,468,164 B1 | 6/2013 | Paleja et al. |
| 8,522,343 B2 | 8/2013 | Hernacki |
| 8,571,536 B2 | 10/2013 | Urbanek |
| 8,612,967 B1 | 12/2013 | Delker |
| 8,626,165 B1 | 1/2014 | Narasimhan et al. |
| 8,639,245 B2 | 1/2014 | Shi et al. |
| 8,666,383 B1 | 3/2014 | Mauer et al. |
| 8,699,377 B2 | 4/2014 | Veillette |
| 8,819,188 B2 | 8/2014 | Blatherwick et al. |
| 8,825,039 B2 | 9/2014 | Mizuguchi |
| 8,855,012 B1 | 10/2014 | Suri |
| 8,909,211 B2 | 12/2014 | Huq et al. |
| 8,909,291 B1 | 12/2014 | Spanel et al. |
| 8,938,436 B2 | 1/2015 | Kozempel |
| 8,965,366 B1 | 2/2015 | Somayajula et al. |
| 9,020,479 B1 | 4/2015 | Somayajula et al. |
| 9,026,105 B2 | 5/2015 | Shipley et al. |
| 9,042,877 B1 | 5/2015 | Ghoshal et al. |
| 9,098,368 B1 | 8/2015 | Delker |
| 9,100,769 B2 | 8/2015 | Annan et al. |
| 9,100,819 B2 | 8/2015 | Annan et al. |
| 9,124,719 B2 | 9/2015 | Inlow et al. |
| 9,125,037 B2 | 9/2015 | Masterson et al. |
| 9,143,924 B1 | 9/2015 | Abou-El-Ella et al. |
| 9,161,209 B1 | 10/2015 | Ghoshal et al. |
| 9,161,325 B1 | 10/2015 | Urbanek |
| 9,170,870 B1 | 10/2015 | Masterson et al. |
| 9,198,027 B2 | 11/2015 | Urbanek |
| 9,204,239 B1 | 12/2015 | Sumner |
| 9,204,286 B1 | 12/2015 | Annan et al. |
| 9,208,513 B1 | 12/2015 | Mauer et al. |
| 9,226,133 B1 | 12/2015 | Spanel et al. |
| 9,280,483 B1 | 3/2016 | Ghoshal et al. |
| 9,301,081 B1 | 3/2016 | Callan et al. |
| 9,304,668 B2 | 4/2016 | Rezende et al. |
| 9,307,400 B1 | 4/2016 | Blinn et al. |
| 9,313,643 B1 | 4/2016 | Ghoshal et al. |
| 9,319,270 B2 | 4/2016 | Bestmann et al. |
| 9,357,378 B1 | 5/2016 | Delker et al. |
| 9,363,622 B1 | 6/2016 | Ahn et al. |
| 9,392,395 B1 | 7/2016 | Indurkar |
| 9,398,462 B1 | 7/2016 | Delker et al. |
| 9,420,399 B2 | 8/2016 | Urbanek |
| 9,420,496 B1 | 8/2016 | Indurkar |
| 9,426,641 B1 | 8/2016 | Ghoshal et al. |
| 9,439,025 B1 | 9/2016 | Ghoshal et al. |
| 9,451,446 B2 | 9/2016 | Spanel et al. |
| 9,532,211 B1 | 12/2016 | Sumner |
| 9,549,009 B1 | 1/2017 | Annan et al. |
| 9,603,009 B1 | 3/2017 | Indurkar |
| 2002/0091931 A1 | 7/2002 | Quick, Jr. et al. |
| 2002/0142783 A1 | 10/2002 | Yoldi et al. |
| 2003/0023514 A1 | 1/2003 | Adler et al. |
| 2003/0031235 A1 | 2/2003 | Kim et al. |
| 2003/0217145 A1 | 11/2003 | Leung et al. |
| 2004/0033798 A1 | 2/2004 | Robin et al. |
| 2004/0092248 A1 | 5/2004 | Kelkar et al. |
| 2004/0093109 A1 | 5/2004 | O'Connor et al. |
| 2004/0116163 A1 | 6/2004 | Kim et al. |
| 2004/0137890 A1* | 7/2004 | Kalke ............... G06Q 30/012 455/418 |
| 2004/0137891 A1 | 7/2004 | Clark et al. |
| 2004/0254975 A1 | 12/2004 | Teh et al. |
| 2004/0261041 A1 | 12/2004 | Parakkuth et al. |
| 2005/0020308 A1 | 1/2005 | Lai |
| 2005/0079855 A1 | 4/2005 | Jethi et al. |
| 2005/0079863 A1 | 4/2005 | Macaluso |
| 2005/0085222 A1 | 4/2005 | Przybilski et al. |
| 2005/0114114 A1 | 5/2005 | Rudolph |
| 2005/0119001 A1 | 6/2005 | Watanabe |
| 2005/0164737 A1 | 7/2005 | Brown |
| 2005/0188262 A1 | 8/2005 | Rosenman et al. |
| 2005/0197098 A1 | 9/2005 | Trossen |
| 2005/0203703 A1 | 9/2005 | Chang |
| 2006/0025151 A1 | 2/2006 | Karaoguz et al. |
| 2006/0121894 A1 | 6/2006 | Ganesan |
| 2006/0126620 A1 | 6/2006 | Bonar et al. |
| 2006/0135144 A1 | 6/2006 | Jothipragasam |
| 2006/0154651 A1 | 7/2006 | Knowles |
| 2006/0203722 A1 | 9/2006 | Oommen |
| 2006/0208071 A1 | 9/2006 | Chang et al. |
| 2006/0235944 A1 | 10/2006 | Haslam |
| 2006/0236325 A1 | 10/2006 | Rao et al. |
| 2006/0242150 A1* | 10/2006 | Jogand-Coulomb ... G06F 21/10 |
| 2006/0246949 A1 | 11/2006 | Gupta et al. |
| 2007/0004404 A1 | 1/2007 | Buckley et al. |
| 2007/0015538 A1 | 1/2007 | Wang |
| 2007/0043667 A1* | 2/2007 | Qawami ................ G06F 21/10 705/50 |
| 2007/0082655 A1 | 4/2007 | Link et al. |
| 2007/0099599 A1 | 5/2007 | Smith et al. |
| 2007/0129057 A1 | 6/2007 | Xu et al. |
| 2007/0130156 A1 | 6/2007 | U. Tenhunen et al. |
| 2007/0165654 A1 | 7/2007 | Chai et al. |
| 2007/0169084 A1 | 7/2007 | Frank et al. |
| 2007/0190939 A1 | 8/2007 | Abel |
| 2007/0192854 A1* | 8/2007 | Kelley ................. G06F 21/53 726/22 |
| 2007/0197234 A1 | 8/2007 | Gill et al. |
| 2007/0250645 A1 | 10/2007 | Meadows et al. |
| 2007/0254635 A1 | 11/2007 | Montelius |
| 2008/0022395 A1* | 1/2008 | Holtzman ......... G06F 12/1483 726/19 |
| 2008/0039114 A1 | 2/2008 | Phatak et al. |
| 2008/0046583 A1 | 2/2008 | Rao |
| 2008/0046880 A1 | 2/2008 | Jun et al. |
| 2008/0046997 A1 | 2/2008 | Wang |
| 2008/0051076 A1 | 2/2008 | OShaughnessy et al. |
| 2008/0057957 A1 | 3/2008 | Altbaum et al. |
| 2008/0062900 A1 | 3/2008 | Rao |
| 2008/0065753 A1 | 3/2008 | Rao |
| 2008/0109662 A1 | 5/2008 | Natarajan et al. |
| 2008/0146280 A1 | 6/2008 | Sasse et al. |
| 2008/0155275 A1 | 6/2008 | Natarajan et al. |
| 2008/0160970 A1 | 7/2008 | Srinivas Reddy et al. |
| 2008/0167027 A1 | 7/2008 | Gautier et al. |
| 2008/0171532 A1 | 7/2008 | Shieh et al. |
| 2008/0188210 B1 | 8/2008 | Choi et al. |
| 2008/0225806 A1 | 9/2008 | Arian et al. |
| 2008/0281511 A1 | 11/2008 | Miyata |
| 2008/0300967 A1 | 12/2008 | Buckley et al. |
| 2008/0318547 A1 | 12/2008 | Ballou, Jr. et al. |
| 2009/0036165 A1 | 2/2009 | Brede |
| 2009/0061840 A1 | 3/2009 | Fleischman et al. |
| 2009/0075592 A1 | 3/2009 | Nystrom et al. |
| 2009/0093242 A1 | 4/2009 | Bhalekar et al. |
| 2009/0094350 A1 | 4/2009 | Rive et al. |
| 2009/0106200 A1 | 4/2009 | Salinas et al. |
| 2009/0124250 A1 | 5/2009 | Topaltzas et al. |
| 2009/0156190 A1 | 6/2009 | Fisher |
| 2009/0156209 A1 | 6/2009 | Franklin et al. |
| 2009/0239518 A1 | 9/2009 | Feuillette |
| 2009/0247124 A1 | 10/2009 | de Atley et al. |
| 2009/0259974 A1 | 10/2009 | Lin |
| 2009/0260004 A1 | 10/2009 | Datta et al. |
| 2009/0307763 A1 | 12/2009 | Rawlins et al. |
| 2010/0048193 A1 | 2/2010 | Ortion et al. |
| 2010/0060456 A1 | 3/2010 | Forster |
| 2010/0075669 A1 | 3/2010 | Sparks et al. |
| 2010/0080143 A1 | 4/2010 | Topaltzas et al. |
| 2010/0133335 A1 | 6/2010 | Maguid et al. |
| 2010/0136960 A1 | 6/2010 | Knezevic |

(56) References Cited

U.S. PATENT DOCUMENTS

| | | | |
|---|---|---|---|
| 2010/0138652 A1* | 6/2010 | Sela | G06F 21/445 713/158 |
| 2010/0159876 A1 | 6/2010 | Brown et al. | |
| 2010/0161724 A1 | 6/2010 | Sathyan et al. | |
| 2010/0161928 A1* | 6/2010 | Sela | G06F 12/1441 711/163 |
| 2010/0167696 A1 | 7/2010 | Smith et al. | |
| 2010/0190479 A1 | 7/2010 | Scott et al. | |
| 2010/0192120 A1 | 7/2010 | Raleigh | |
| 2010/0194632 A1 | 8/2010 | Raento et al. | |
| 2010/0198939 A1 | 8/2010 | Raleigh | |
| 2010/0203864 A1 | 8/2010 | Howard | |
| 2010/0207742 A1 | 8/2010 | Buhot et al. | |
| 2010/0222031 A1 | 9/2010 | Carolan et al. | |
| 2010/0222047 A1 | 9/2010 | Vanderlinden et al. | |
| 2010/0250368 A1 | 9/2010 | Porco | |
| 2010/0262638 A1 | 10/2010 | Fitzgerald | |
| 2010/0291898 A1 | 11/2010 | Sanding et al. | |
| 2010/0311391 A1 | 12/2010 | Siu et al. | |
| 2010/0311404 A1 | 12/2010 | Shi et al. | |
| 2010/0311468 A1 | 12/2010 | Shi et al. | |
| 2010/0312794 A1 | 12/2010 | Liu | |
| 2010/0325622 A1 | 12/2010 | Morton | |
| 2010/0332639 A1 | 12/2010 | Diaz et al. | |
| 2011/0003590 A1 | 1/2011 | Yoon et al. | |
| 2011/0014913 A1 | 1/2011 | Yoon et al. | |
| 2011/0026501 A1 | 2/2011 | Sharaga et al. | |
| 2011/0028138 A1 | 2/2011 | Davies-Moore et al. | |
| 2011/0030062 A1 | 2/2011 | Hsu et al. | |
| 2011/0035421 A1* | 2/2011 | Laird-McConnell | G06F 17/30165 707/822 |
| 2011/0069702 A1 | 3/2011 | Oktay et al. | |
| 2011/0081885 A1 | 4/2011 | Sennett et al. | |
| 2011/0086611 A1 | 4/2011 | Klein et al. | |
| 2011/0119716 A1 | 5/2011 | Coleman, Sr. | |
| 2011/0136482 A1 | 6/2011 | Kaliner | |
| 2011/0138074 A1 | 6/2011 | Onda et al. | |
| 2011/0161659 A1 | 6/2011 | Himawan et al. | |
| 2011/0165836 A1 | 7/2011 | Dixon et al. | |
| 2011/0173685 A1 | 7/2011 | Chai et al. | |
| 2011/0202680 A1 | 8/2011 | Bells et al. | |
| 2011/0202976 A1 | 8/2011 | Chow et al. | |
| 2011/0208338 A1 | 8/2011 | Eteminan et al. | |
| 2011/0208865 A1 | 8/2011 | Knowles et al. | |
| 2011/0222404 A1 | 9/2011 | Watson et al. | |
| 2011/0230136 A1 | 9/2011 | Washiro | |
| 2011/0258249 A1 | 10/2011 | Biggs et al. | |
| 2011/0263294 A1 | 10/2011 | Kim et al. | |
| 2011/0294484 A1 | 12/2011 | Martin et al. | |
| 2011/0296399 A1 | 12/2011 | Tugnawat et al. | |
| 2011/0306318 A1 | 12/2011 | Rodgers et al. | |
| 2011/0314129 A1 | 12/2011 | Rezaiifar et al. | |
| 2012/0027059 A1 | 2/2012 | Zhao et al. | |
| 2012/0030512 A1 | 2/2012 | Wadhwa et al. | |
| 2012/0035989 A1 | 2/2012 | Abel et al. | |
| 2012/0036282 A1 | 2/2012 | Chen et al. | |
| 2012/0046022 A1 | 2/2012 | Kalke et al. | |
| 2012/0047227 A1 | 2/2012 | Haggerty et al. | |
| 2012/0054022 A1 | 3/2012 | Kosashvili | |
| 2012/0094684 A1 | 4/2012 | Reddy | |
| 2012/0106509 A1 | 5/2012 | Klingenbrunn et al. | |
| 2012/0129513 A1 | 5/2012 | van der Laak | |
| 2012/0129572 A1 | 5/2012 | Johnstone et al. | |
| 2012/0135733 A1 | 5/2012 | Cormier et al. | |
| 2012/0142314 A1 | 6/2012 | Mohammed | |
| 2012/0151199 A1* | 6/2012 | Shriver | G06F 21/575 713/2 |
| 2012/0158580 A1 | 6/2012 | Eram et al. | |
| 2012/0203824 A1* | 8/2012 | Oommen | H04L 41/0809 709/203 |
| 2012/0208511 A1 | 8/2012 | Vanderlinden et al. | |
| 2012/0230587 A1 | 9/2012 | Arseneau | |
| 2012/0260095 A1 | 10/2012 | Von Hauck et al. | |
| 2012/0276872 A1 | 11/2012 | Knauth et al. | |
| 2012/0282891 A1 | 11/2012 | Mohammed et al. | |
| 2012/0282924 A1 | 11/2012 | Tagg et al. | |
| 2012/0309377 A1 | 12/2012 | De Atley et al. | |
| 2013/0010641 A1 | 1/2013 | Dinan | |
| 2013/0013671 A1 | 1/2013 | Relan et al. | |
| 2013/0023235 A1* | 1/2013 | Fan | H04W 48/18 455/411 |
| 2013/0031191 A1 | 1/2013 | Bott | |
| 2013/0031234 A1 | 1/2013 | Alfano et al. | |
| 2013/0031541 A1* | 1/2013 | Wilks | G06F 8/665 717/176 |
| 2013/0041988 A1 | 2/2013 | Rodermund et al. | |
| 2013/0046951 A1 | 2/2013 | Jones | |
| 2013/0065557 A1 | 3/2013 | Zhang et al. | |
| 2013/0065578 A1 | 3/2013 | Raleigh et al. | |
| 2013/0072168 A1 | 3/2013 | Colucciello et al. | |
| 2013/0080911 A1 | 3/2013 | Klemm | |
| 2013/0085914 A1 | 4/2013 | McPherson et al. | |
| 2013/0111461 A1 | 5/2013 | Zubas et al. | |
| 2013/0124186 A1 | 5/2013 | Donabedian et al. | |
| 2013/0184029 A1 | 7/2013 | Lim et al. | |
| 2013/0196647 A1 | 8/2013 | Raleigh et al. | |
| 2013/0198567 A1 | 8/2013 | Ahmed et al. | |
| 2013/0222395 A1 | 8/2013 | Blas, Jr. | |
| 2013/0275560 A1 | 10/2013 | Bestmann et al. | |
| 2013/0281085 A1 | 10/2013 | Sen et al. | |
| 2013/0295902 A1 | 11/2013 | Justen et al. | |
| 2013/0303142 A1 | 11/2013 | Burcham et al. | |
| 2013/0310003 A1 | 11/2013 | Sadhvani Rita et al. | |
| 2013/0311836 A1 | 11/2013 | Hurst Cameron et al. | |
| 2013/0318518 A1 | 11/2013 | Paalanen et al. | |
| 2013/0326359 A1 | 12/2013 | Beckert et al. | |
| 2014/0045483 A1 | 2/2014 | Whidden | |
| 2014/0068779 A1 | 3/2014 | Tan et al. | |
| 2014/0075567 A1 | 3/2014 | Raleigh et al. | |
| 2014/0080467 A1 | 3/2014 | Urbanek | |
| 2014/0099916 A1 | 4/2014 | Mallikarjunan et al. | |
| 2014/0113610 A1 | 4/2014 | Ramprasad et al. | |
| 2014/0122563 A1* | 5/2014 | Singh | H04L 67/34 709/203 |
| 2014/0134981 A1 | 5/2014 | Park et al. | |
| 2014/0140507 A1 | 5/2014 | Park et al. | |
| 2014/0206313 A1 | 7/2014 | Spanel et al. | |
| 2014/0228012 A1 | 8/2014 | Annan et al. | |
| 2014/0228042 A1 | 8/2014 | Annan et al. | |
| 2014/0274032 A1 | 9/2014 | Shipley et al. | |
| 2014/0342715 A1 | 11/2014 | Gu et al. | |
| 2014/0373184 A1 | 12/2014 | Mahaffey et al. | |
| 2015/0011311 A1 | 1/2015 | Relan et al. | |
| 2015/0017962 A1 | 1/2015 | Howard et al. | |
| 2015/0033291 A1* | 1/2015 | Nicolau | G06Q 20/3278 726/3 |
| 2015/0040246 A1 | 2/2015 | Yuen et al. | |
| 2015/0065105 A1* | 3/2015 | Masterson | H04W 8/205 455/418 |
| 2015/0094041 A1 | 4/2015 | Jung et al. | |
| 2015/0111565 A1 | 4/2015 | Urbanek | |
| 2015/0133094 A1 | 5/2015 | Lindeman et al. | |
| 2015/0193217 A1 | 7/2015 | Xiang et al. | |
| 2015/0220245 A1 | 8/2015 | Wojcik et al. | |
| 2015/0242336 A1* | 8/2015 | Loreskar | G06F 21/72 711/164 |
| 2015/0304506 A1 | 10/2015 | Zhu et al. | |
| 2015/0319178 A1 | 11/2015 | Desai et al. | |
| 2015/0331590 A1 | 11/2015 | Yasui | |
| 2015/0370428 A1 | 12/2015 | Chan et al. | |
| 2016/0044091 A1 | 2/2016 | Doumet | |
| 2016/0094931 A1 | 3/2016 | Urbanek | |
| 2016/0234675 A1 | 8/2016 | Ghoshal et al. | |
| 2016/0239317 A1 | 8/2016 | Cuddihy et al. | |

FOREIGN PATENT DOCUMENTS

| | | |
|---|---|---|
| GB | 2292047 A | 2/1996 |
| JP | 5924347 B2 | 4/2015 |
| KR | 2006039974 A | 5/2006 |
| WO | WO2010135257 A1 | 11/2010 |
| WO | WO2012078753 A1 | 6/2012 |

(56) References Cited

FOREIGN PATENT DOCUMENTS

| WO | WO 2012078753 A1 * | 6/2012 | ............ H04W 4/001 |
|---|---|---|---|
| WO | WO2013169983 A1 | 11/2013 | |
| WO | WO2014020237 A1 | 2/2014 | |
| WO | WO2014046814 A1 | 3/2014 | |
| WO | WO2014113128 A1 | 7/2014 | |
| WO | WO2014123758 A1 | 8/2014 | |
| WO | WO2014123759 A1 | 8/2014 | |
| WO | WO2014158430 A1 | 9/2014 | |
| WO | W02015030945 A1 | 3/2015 | |
| WO | WO2015060965 A2 | 4/2015 | |
| WO | WO2016130266 A1 | 8/2016 | |

OTHER PUBLICATIONS

Office Action dated Jun. 16, 2015, U.S. Appl. No. 13/899,567, filed May 22, 2013.
Notice of Allowance dated May 7, 2015, U.S. Appl. No. 13/972,827, filed Aug. 21, 2013.
Notice of Allowance dated May 29, 2015, U.S. Appl. No. 14/085,474, filed Nov. 20, 2013.
Notice of Allowance dated May 8, 2015, U.S. Appl. No. 14/010,518, filed Aug. 27, 2013.
Notice of Allowance dated Jul. 8, 2015, U.S. Appl. No. 14/010,522, filed Aug. 27, 2013.
Notice of Allowance dated Jun. 26, 2015, U.S. Appl. No. 14/010,523, filed Aug. 27, 2013.
Notice of Allowance dated Apr. 28, 2015, U.S. Appl. No. 14/010,524, filed Aug. 27, 2013.
Restriction Requirement dated May 21, 2015, U.S. Appl. No. 14/073,321, filed Nov. 6, 2013.
FAIPP Pre-Interview Communication dated Jul. 8, 2015, U.S. Appl. No. 14/475,399, filed Sep. 2, 2014.
Amazon Kindle e-book reader, on public sale 2007, http://en.wikipedia.org/wiki/Amazon_Kindle. last accessed on Apr. 13, 2015.
Foreign Communication From a Related Counterpart Application, International Preliminary Report on Patentability dated Aug. 20, 2015, PCT/US14/13939, filed on Jan. 30, 2014.
First Action Interview Office Action dated Mar. 16, 2015, U.S. Appl. No. 13/468,028, filed May 9, 2013.
Office Action dated Mar. 2, 2015, U.S. Appl. No. 13/622,234, filed Sep. 18, 2012.
FAIPP Pre-Interview Communication dated Mar. 26, 2015, U.S. Appl. No. 14/522,586, filed Oct. 24, 2014.
FAIPP Pre-Interview Communication dated Apr. 8, 2015, U.S. Appl. No. 13/844,104, filed Mar. 15, 2013.
Notice of Allowance dated Mar. 20, 2015, U.S. Appl. No. 13/763,428, filed Feb. 8, 2013.
Notice of Allowance dated Mar. 26, 2015, U.S. Appl. No. 13/763,434, filed Feb. 8, 2013.
Notice of Allowance dated Jan. 22, 2015, U.S. Appl. No. 13/899,566, filed May 21, 2013.
FAIPP Pre-Interview Communication dated Apr. 15, 2015, U.S. Appl. No. 14/060,712, filed Nov. 20, 2013.
FAIPP Pre-Interview Communication dated Mar. 4, 2015, U.S. Appl. No. 14/010,518, filed Aug. 27, 2013.
FAIPP Pre-Interview Communication dated Apr. 1, 2015, U.S. Appl. No. 14/010,522, filed Aug. 27, 2013.
FAIPP Pre-Interview Communication dated Apr. 3, 2015, U.S. Appl. No. 14/010,523, filed Aug. 27, 2013.
FAIPP Pre-Interview Communication dated Mar. 10, 2015, U.S. Appl. No. 14/010,524, filed Aug. 27, 2013.
FAIPP Pre-Interview Communication dated Apr. 8, 2015, U.S. Appl. No. 14/157,507, filed Jan. 16, 2014.
Foreign Communication from a Related Counterpart—International Preliminary Report on Patentability, dated Apr. 2, 2015, PCT/US13/55023, filed Aug. 15, 2013.
Delker, Jason R., et al. "Subscriber Identity Module (SIM) Card Initiation of Custom Application Launcher Installation on a Mobile Communication Device," filed Mar. 4, 2015, U.S. Appl. No. 14/639,056.
Delker, Jason R., et al. "Network Access Tiered Based on Application Launcher Installation," filed Mar. 4, 2015, U.S. Appl. No. 14/639,060.
FAIPP Pre-Interview Communication dated Mar. 12, 2015, U.S. Appl. No. 13/972,827, filed Aug. 21, 2013.
Ghoshal, Jagannath, et al., "Multi-Step Mobile Device Initiation with Intermediate Partial Reset," filed Aug. 21, 2013, U.S. Appl. No. 13/972,827.
FAIPP Pre-Interview Communication dated Jun. 2, 2015, U.S. Appl. No. 14/152,627, filed Jan. 10, 2013.
Notice of Allowance dated Jul. 7, 2015, U.S. Appl. No. 14/522,586, filed Oct. 24, 2014.
FAIPP Pre-Interview Communication dated Apr. 23, 2014, U.S. Appl. No. 13/763,443, filed Feb. 8, 2013.
Foreign Office Action dated Jul. 7, 2015, Japanese Application Serial No. 2013-543310, filed Jul. 7, 2015.
Notice of Allowance dated Aug. 6, 2015, U.S. Appl. No. 14/152,627, filed Jan. 10, 2013.
Notice of Allowance dated Jul. 15, 2015, U.S. Appl. No. 13/622,234, filed Sep. 18, 2012.
Notice of Allowance dated Jul. 16, 2015, U.S. Appl. No. 13/844,104, filed Mar. 15, 2013.
Final Office Action dated Aug. 10, 2015, U.S. Appl. No. 13/763,443, filed Feb. 8, 2013.
FAIPP Pre-Interview Communication dated Sep. 29, 2015, U.S. Appl. No. 14/163,035, filed Jan. 24, 2014.
FAIPP Pre-Interview Communication dated Aug. 20, 2015, U.S. Appl. No. 14/073,321, filed Nov. 6, 2013.
FAIPP Pre-Interview Communication dated Jul. 15, 2015, U.S. Appl. No. 14/163,041, filed Jan. 24, 2014.
FAIPP Pre-Interview Communication dated Sep. 21, 2015, U.S. Appl. No. 14/231,718, filed Mar. 31, 2014.
Foreign Communication From a Related Counterpart Application, International Preliminary Report on Patentability dated Jul. 30, 2015, PCT/US13/68981, filed on Nov. 7, 2013.
Foreign Communication From a Related Counterpart Application, International Preliminary Report on Patentability dated Aug. 20, 2015, PCT/US14/13936, filed on Jan. 30, 2014.
Foreign Communication From a Related Counterpart Application, International Preliminary Report on Patentability dated Aug. 20, 2015, PCT/US14/13939 , filed on Jan. 30, 2014.
Foreign Communication From a Related Counterpart Application, International Preliminary Report on Patentability dated Sep. 24, 2015, PCT/US14/16650, filed on Feb. 16, 2014.
Dummies, "Power Modes on Your Kindle Paperwhite", http://dummies.com/how-to/content/power-modes-on-your-kindle-paperwhite.html, last accessed on Jul. 31, 2015.
Cushings, "Buy Your Kindle At Waterstones? You're Now Locked Into One Sceensaver . . . The Waterstones Logo", https://www.techdirt.com/articles/20121206/16014421285/buy-your-kindle-waterstones-youre-now-locked-into-one-screensaver-waterstones-logo.shtml, last accessed Aug. 3, 2015.
Wikipedia, Extended Display Identification Data, https://en.wikipedia.org/wiki/Extended_Display_Identification_Data, last accessed Aug. 5, 2015.
Foreign Notice of Allowance dated Mar. 21, 2016, Japanese Application Serial No. 2013-543310, filed Jul. 7, 2015.
Advisory Action dated Jan. 29, 2016, U.S. Appl. No. 13/468,028, filed May 9, 2012.
Office Action dated Apr. 4, 2016, U.S. Appl. No. 13/468,028, filed May 9, 2012.
FAIPP Pre-Interview Communication dated Jan. 11, 2016, U.S. Appl. No. 14/877,215, filed Oct. 7, 2015.
FAIPP Pre-Interview Communication dated Feb. 25, 2016, U.S. Appl. No. 14/820,522, filed Aug. 6, 2015.
Final Office Action dated Feb. 24, 2016, U.S. Appl. No. 14/060,719, filed Oct. 23, 2013.
Final Office Action dated Feb. 16, 2016, U.S. Appl. No. 14/163,035, filed Jan. 24, 2014.

(56) References Cited

OTHER PUBLICATIONS

FAIPP Pre-Interview Communication dated Mar. 16, 2016, U.S. Appl. No. 13/968,259, filed Aug. 15, 2013.
Notice of Allowance dated Feb. 25, 2016, U.S. Appl. No. 14/157,507, filed Jan. 16, 2014.
Notice of Allowance dated Jan. 27, 2016, U.S. Appl. No. 14/075,687, filed Nov. 8, 2013.
First Action Interview Office Action dated Feb. 2, 2016, U.S. Appl. No. 14/297,429, filed Jun. 5, 2014.
Final Office Action dated Jan. 12, 2016, U.S. Appl. No. 14/163,041, filed Jan. 24, 2014.
First Action Interview Office Action dated Jan. 19, 2016, U.S. Appl. No. 14/231,718, filed Mar. 31, 2014.
Notice of Allowance dated Feb. 3, 2016, U.S. Appl. No. 14/639,056, filed Mar. 4, 2015.
Notice of Allowance dated Mar. 11, 2016, U.S. Appl. No. 14/639,060, filed Mar. 4, 2015.
Foreign Communication from a Related Counterpart—International Preliminary Report on Patentability, dated Mar. 10, 2016, PCT/US14/46773, filed on Jul. 16, 2014.
Foreign Communication from a Related Counterpart—International Search Report and Written Opinion, dated Apr. 4, 2016, PCT/US16/13272, filed on Jan. 13, 2016.
Ghoshal, Jagannath, et al., "Dynamic Subscriber Identity Module," filed Mar. 7, 2016, U.S. Appl. No. 15/063,383.
Notice of Allowance dated Apr. 13, 2016, U.S. Appl. No. 14/877,215, filed Oct. 7, 2015.
EP Search Report dated May 17, 2016, European Application No. 14749499.1, filed on Feb. 8, 2013.
Office Action dated May 3, 2016, U.S. Appl. No. 13/763,443, filed Feb. 8, 2013.
Notice of Allowance dated May 6, 2016, U.S. Appl. No. 14/820,522, filed Aug. 6, 2015.
Advisory Action dated Apr. 20, 2016, U.S. Appl. No. 14/060,719, filed Oct. 23, 2013.
Office Action dated Jun. 6, 2016, U.S. Appl. No. 14/060,719, filed Oct. 23, 2013.
Office Action dated May 10, 2016, U.S. Appl. No. 14/163,035, filed Jan. 24, 2014.
Final Office Action dated Jun. 14, 2016, U.S. Appl. No. 13/968,259, filed Aug. 15, 2013.
Notice of Allowance dated Apr. 20, 2016, U.S. Appl. No. 14/297,429, filed Jun. 5, 2014.
Notice of Allowance dated Apr. 13, 2016, U.S. Appl. No. 14/163,041, filed Jan. 24, 2014.
Final Office Action dated Apr. 19, 2016, U.S. Appl. No. 14/231,718, filed Mar. 31, 2014.
Advisory Action dated Jun. 28, 2016, U.S. Appl. No. 14/231,718, filed Mar. 31, 2014.
Benjamin, Jeff, "How to change your iPhone carrier logo without jailbreaking," idownloadblog.com, Dec. 31, 2012.
Wikipedia, "Motorola Fone," Mar. 21, 2016.
Mobile Gazette, Motorola FONE F3 Review, www.mobilegazette.com, Sep. 16, 2007.
Delker, Jason R., et al. "Network Access Tiered Based on Application Launcher Installation," filed May 25, 2016, U.S. Appl. No. 15/164,530.
Foreign Communication from a Related Counterpart—International Preliminary Report on Patentability, dated May 6, 2016, PCT/US14/56778, filed on Sep. 22, 2014.
EP Search Report dated Jul. 7, 2016, European Application Serial No. 13871478.7 filed on Jan. 18, 2013.
EP Search Report dated Aug. 24, 2015, European Application Serial No. 14749462.9, filed on Feb. 8, 2013.
Notice of Allowance dated Sep. 12, 2016, U.S. Appl. No. 13/763,443, filed Feb. 8, 2013.
Notice of Allowance dated Aug. 18, 2016, U.S. Appl. No. 13/968,259, filed Aug. 15, 2013.
Office Action dated Oct. 6, 2016, U.S. Appl. No. 14/231,718, filed Mar. 31, 2014.
Yota Devices, "Hands-on with the YotaPhone: the e-ink Android phone that nobody expected," New York Times, 2010.
Ghoshal, Jagannath, et al., "System and Method of Mobile Phone Customization Based on Universal Manifest with Feature Override," filed Sep. 16, 2016, U.S. Appl. No. 15/268,347.
Ghoshal, Jagannath, et al., "System and Method of Mobile Phone Customization Based on Universal Manifest," filed Sep. 14, 2016, U.S. Appl. No. 15/265,833.
Advisory Action dated Dec. 17, 2014, U.S. Appl. No. 13/622,234, filed Sep. 18, 2012.
Notice of Allowance dated Nov. 22, 2014, U.S. Appl. No. 13/744,861, filed Jan. 18, 2013.
First Action Interview Pre-Interview Communication dated Oct. 22, 2014, U.S. Appl. No. 13/763,428, filed Feb. 8, 2013.
Notice of Allowance dated Dec. 29, 2014, U.S. Appl. No. 13/831,504, filed Mar. 14, 2013.
First Action Interview Pre-Interview Communication dated Nov. 20, 2014, filed on May 21, 2013.
Foreign Communication from a Related Counterpart Application, "Preliminary Report on Patentability," dated Nov. 20, 2014, PCT/US13/40278 filed on May 9, 2013.
Foreign Communication from a Related Counterpart—International Search Report and Written Opinion, dated Dec. 17, 2014, PCT/US14/46773, filed on Jul. 16, 2014.
Foreign Communication from a Related Counterpart—International Search Report and Written Opinion, dated Dec. 30, 2014, PCT/US14/56778, filed Sep. 22, 2014.
Spanel, Robert L., et al., Patent Application entitled "Dynamic Remotely Managed SIM Profile" U.S. Appl. No. 14/522,586, filed Oct. 24, 2014.
Urbanek, Robert E, "Delivery of Branding Content and Customizations to a Mobile Communication Device", filed Sep. 22, 2014, International Serial No. PCT/US14/56778.
Koller, Gary D., et al., "Out of the Box Experience (OOBE) Country Choice Using Wi-Fi Layer Transmission," filed Oct. 31, 2014, U.S. Appl. No. 14/530,666.
Blinn, Benjamin P., et al. "System and Method of Efficient Mobile Device Network Brand Customization," filed Sep. 2, 2014, U.S. Appl. No. 14/475,399.
Notice of Allowance dated Apr. 26, 2012, U.S. Appl. No. 12/962,620, filed Dec. 7, 2010.
Notice of Allowance dated Nov. 2, 2012, U.S. Appl. No. 13/556,202, filed Jul. 24, 2012.
Notice of Allowance dated Jun. 11, 2013, U.S. Appl. No. 13/752,386, filed Jan. 28, 2013.
First Action Interview Pre-Interview Communication dated Feb. 25, 2013, U.S. Appl. No. 13/149,505, filed May 31, 2013.
First Action Interview Office Action dated May 8, 2013, U.S. Appl. No. 13/149,505, filed May 31, 2013.
Notice of Allowance dated Aug. 9, 2013, U.S. Appl. No. 13/149,505, filed May 31, 2013.
First Action Interview Pre-Interview Communication dated Aug. 13, 2013, U.S. Appl. No. 13/335,941, filed Dec. 23, 2011.
Notice of Allowance dated Oct. 9, 2013, U.S. Appl. No. 13/335,941, filed Dec. 23, 2011.
First Action Interview Pre-Interview Communication dated Apr. 23, 2014, U.S. Appl. No. 13/622,234, filed Sep. 18, 2012.
Final Office Action dated Sep. 19, 2014, U.S. Appl. No. 13/622,234, filed Sep. 18, 2012.
FAIPP Pre-Interview Communication dated Mar. 19, 2014, U.S. Appl. No. 13/744,847, filed Jan. 18, 2013.
Notice of Allowance dated Aug. 4, 2014, U.S. Appl. No. 13/744,847, filed Jan. 18, 2013.
FAIPP Pre-Interview Communication dated Jul. 16, 2014, U.S. Appl. No. 13/744,861, filed Jan. 18, 2013.
First Action Interview Pre-Interview Communication dated Apr. 3, 2014, U.S. Appl. No. 13/763,434, filed Feb. 8, 2013.
Final Office Action dated Aug. 19, 2014, U.S. Appl. No. 13/763,434, filed Feb. 8, 2013.
Office Action dated Aug. 7, 2014, U.S. Appl. No. 13/831,504, filed Mar. 14, 2013.

(56) References Cited

OTHER PUBLICATIONS

Foreign Communication from a Related Counterpart—International Search Report and Written Opinion, dated Feb. 29, 2012, PCT/US2011/063736, filed on Dec. 7, 2011.

Foreign Communication from a Related Counterpart Application, "Preliminary Report on Patentability", dated Jun. 20, 2013, PCT/US2011/063736 filed on Dec. 7, 2011.

Foreign Communication from a Related Counterpart—International Search Report and Written Opinion, dated Jul. 24, 2013, PCT/US13/40278, filed on May 9, 2013.

Foreign Communication from a Related Counterpart—International Search Report and Written Opinion, dated Nov. 14, 2013, PCT/US13/55023, filed on Aug. 15, 2013.

Foreign Communication From a Related Counterpart Application, International Search Report and Written Opinion dated Jan. 24, 2014, International Application No. PCT/US13/68981 filed on Nov. 7, 2013.

Foreign Communication from a Related Counterpart—International Search Report and Written Opinion, dated May 19, 2014, PCT/US14/13936, filed on Jan. 30, 2014.

Foreign Communication from a Related Counterpart—International Search Report and Written Opinion, dated May 14, 2014, PCT/US14/13939, filed on Jan. 30, 2014.

Delker, Jason R., "Loading Branded Media Outside System Partition", filed Oct. 30, 2013 U.S. Appl. No. 14/066,947.

Mauer, Brian D., et al., "Automatic Branding of Generic Applications", filed Jan. 10, 2013, U.S. Appl. No. 14/152,627.

Spanel, Robert L., et al., Patent Application entitled "Dynamic Remotely Managed SIM Profile" U.S. Appl. No. 13/744,847, filed Jan. 18, 2013.

Annan, Brandon C., et al.,"System and Method of Branding and Labeling a Mobile Device", filed Mar. 15, 2013, U.S. Appl. No. 13/844,104.

Annan, Brandon C., et al.,"Electronic Fixed Brand Labeling", filed Feb. 8, 2013, U.S. Appl. No. 13/763,443.

Ghoshal, Jagannath, et al.,"Rebranding a Portable Electronic Device While Maintaining User Data", filed May 22, 2013, U.S. Appl. No. 13/899,567.

Ghoshal, Jagannath, et al.,"System and Method for Retrofitting a Branding Framework into a Mobile Communication Device", filed May 21, 2013, U.S. Appl. No. 13/899,566.

Urbanek, Robert E., "Implementation of Remotely Hosted Branding Content and Customizations", filed Oct. 23, 2013, U.S. Appl. No. 14/085,474.

Urbanek, Robert E., "Subscriber Identity Module Virtualization", filed Nov. 20, 2013, U.S. Appl. No. 14/060,719.

Indurkar, Dhananjay, "System and Method of Branding a Device Independent of Device Activation", filed Jan. 24, 2014, U.S. Appl. No. 14/163,035.

Sumner, Bret D., "Directing Server Connection Based on Location Identifier", filed Aug. 15, 2013, U.S. Appl. No. 13/968,259.

Abou-El-Ella, Hassan, et al., "Segmented Customization Payload Delivery", filed Aug. 27, 2013, U.S. Appl. No. 14/010,518.

Sumner, Bret D., "Segmented Customization Package Within Distributed Server Architecture", filed Aug. 27, 2013, U.S. Appl. No. 14/010,522.

Masterson, Michelle E., et al., "Development and Testing of Payload Receipt by a Portable Electronic Device", filed Aug. 27, 2013, U.S. Appl. No. 14/010,523.

Masterson, Michelle E., et al., "System and Methods for Deferred and Remote Device Branding", filed Aug. 27, 2013, U.S. Appl. No. 14/010,524.

Masterson, Michelle E., et al., "System and Methods for Deferred and Remote Device Branding", filed Jul. 16, 2014, International Serial No. PCT/US14/46773.

Callan, Jeffery S., et al., "Delivery of Oversized Branding Elements for Customization", filed Nov. 6, 2013, U.S. Appl. No. 14/073,321.

Indurkar, Dhananjay, "Background Delivery of Device Configuration and Branding", filed Jan. 16, 2014, U.S. Appl. No. 14/157,507.

Ahn, Chul Jin, et al., "Separation of Client Identification Composition from Customization Payload to Original Equipment Manufacturer Layer", filed Nov. 8, 2013, U.S. Appl. No. 14/075,687.

Ghoshal, Jagannath, et al., "Multiple Carrier Partition Dynamic Access on a Mobile Device", filed Jun. 5, 2014, U.S. Appl. No. 14/297,429.

Indurkar, Dhananjay, "Activation Sequence Using Permission Based Connection to Network", filed Jan. 24, 2014, U.S. Appl. No. 14/163,041.

Ahn, Chul Jin, et al., "Customization for Preloaded Applications", filed Mar. 31, 2014, U.S. Appl. No. 14/231,718.

First Action Interview Pre-Interview Communication dated Sep. 22, 2014, U.S. Appl. No. 13/468,028, filed May 9, 2013.

Foreign Communication from a Related Counterpart—International Search Report and Written Opinion, dated Jun. 3, 2014,PCT/US14/16650, filed on Feb. 16, 2014.

Urbanek, Robert E., "Delivery of Branding Content and Customizations to a Mobile Communication Device", filed , 201, International Serial No. PCT/US14/56778.

Final Office Action dated Nov. 4, 2015, U.S. Appl. No. 13/468,028, filed May 9, 2012.

Advisory Action dated Nov. 3, 2015, U.S. Appl. No. 13/763,443, filed Feb. 8, 2013.

Notice of Allowance dated Oct. 26, 2015, U.S. Appl. No. 13/899,567, filed May 22, 2013.

FAIPP Pre-Interview Communication dated Nov. 2, 2015, U.S. Appl. No. 14/060,719, filed Oct. 23, 2013.

First Action Interview Office Action dated Dec. 14, 2015, U.S. Appl. No. 14/060,719, filed Oct. 23, 2013.

Notice of Allowance dated Nov. 4, 2015, U.S. Appl. No. 14/073,321, filed Nov. 6, 2013.

First Action Interview Office Action dated Oct. 16, 2015, U.S. Appl. No. 14/157,507, filed Jan. 16, 2014.

FAIPP Pre-Interview Communication dated Oct. 7, 2015, U.S. Appl. No. 14/075,687, filed Nov. 8, 2013.

FAIPP Pre-Interview Communication dated Nov. 19, 2015, U.S. Appl. No. 14/297,429, filed Jun. 5, 2014.

Notice of Allowance dated Dec. 4, 2015, U.S. Appl. No. 14/475,399, filed Sep. 2, 2014.

Supplemental Notice of Allowability dated Dec. 14, 2015, U.S. Appl. No. 14/475,399, filed Sep. 2, 2014.

Urbanek, Robert E., "Generic Mobile Devices Customization Framework," filed Oct. 7, 2015, U.S. Appl. No. 14/877,215.

Ghoshal, Jagannath, et al., "Multi-Step Mobile Device Initiation with Intermediate Partial Reset," filed Aug. 6, 2015, U.S. Appl. No. 14/820,522.

FAIPP Pre-Interview Communication dated Nov. 4, 2015, U.S. Appl. No. 14/619,677, filed Feb. 11, 2015.

Notice of Allowance dated Dec. 11, 2015, U.S. Appl. No. 14/619,677, filed Feb. 11, 2015.

Ghoshal, Jagannath, et al., "Dynamic Subscriber Identity Module," filed Feb. 11, 2015, U.S. Appl. No. 14/619,677.

EP Search Report dated Oct. 12, 2016, EP International Application No. 11847301.6, filed on Jun. 20, 2013.

Final Office Action dated Oct. 26, 2016, U.S. Appl. No. 13/468,028, filed May 9, 2012.

Notice of Allowance dated Nov. 2, 2016, U.S. Appl. No. 14/163,035, filed Jan. 24, 2014.

FAIPP Pre-Interview Communication dated Nov. 4, 2016, U.S. Appl. No. 14/530,666, filed Oct. 31, 2014.

Japanese Office Action dated Apr. 13, 2017, JP Application No. 2015-531933; filed on Feb. 16, 2015.

Final Office Action dated Jan. 26, 2017, U.S. Appl. No. 14/060,719, filed Oct. 23, 2013.

Advisory Action dated Mar. 24, 2017, U.S. Appl. No. 14/060,719, filed Oct. 23, 2013.

Notice of Allowance dated Feb. 21, 2017, U.S. Appl. No. 14/231,718, filed Mar. 31, 2014.

FAIPP Office Action dated Jan. 31, 2017, U.S. Appl. No. 14/530,666, filed Oct. 31, 2014.

(56) References Cited

OTHER PUBLICATIONS

FAIPP Pre-Interview Communication dated Apr. 10, 2017, U.S. Appl. No. 15/164,530, filed May 25, 2016.

* cited by examiner

DELIVERY OF BRANDING CONTENT AND CUSTOMIZATIONS TO A MOBILE COMMUNICATION DEVICE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile communication devices may be purchased at service provider retail stores, electronics retail stores, and/or at general retail stores. A variety of activities may be performed to bring a new mobile communication into service. To use a mobile communication device on a cellular network, it may first be provisioned. Provisioning a mobile communication device (e.g. a mobile phone) to operate on a wireless network involves defining and/or adjusting the mobile communication device's settings that are stored in the device, and the settings stored on the network, so that the mobile communication device may properly access communication services and/or execute one or more desired applications, and the network may recognize the mobile communication device as authorized to receive service for those applications.

For example, a mobile phone may be provisioned for just voice service, voice and data service, special enterprise data service, internet access, e-mail, voice-mail, GPS-related services, location monitoring, etc. Provisioning may also include preferred roaming lists, user zone lists, language settings, browser settings, display settings, operating system versions, security settings, access restrictions, geographical settings, etc. The mobile communication device and cellular network may collaborate to provide access to these services.

SUMMARY

In an embodiment, a method for provisioning a mobile device is disclosed. The method comprises: wirelessly delivering a provisioning payload to the mobile device, wherein the payload comprises one or more file locator, and wherein the mobile device has a plurality of customization content items pre-loaded to a system memory partition of the mobile device; accessing at least a portion of the pre-loaded customization content based on the file locator; storing a copy of the pre-loaded customization content referenced by the file locator in a carrier memory partition of the mobile device; and completing a customization process for the mobile device using the customization content stored in the carrier memory partition.

In an embodiment, a method for customizing a mobile device is disclosed. The method comprises: wirelessly receiving a provisioning payload on the mobile device, wherein the payload comprises one or more uniform resource identifier string; accessing pre-loaded customization content based on the uniform resource identifier string, wherein the uniform resource identifier string directs to at least a portion of pre-loaded customization content stored in a system memory partition of the mobile device; and completing a customization process for the mobile device using the customization content stored in the system memory partition.

In an embodiment, a method for customizing a mobile device is disclosed. The method comprises: wirelessly receiving a provisioning payload on the mobile device, wherein the payload comprises customization content and one or more file locator; accessing additional customization content based on the file locator; storing the customization content in a system memory partition on the mobile device; and completing a customization process for the mobile device using the customization content. These and other features will be more clearly understood from the following detailed description taken in conjunction with the accompanying drawings and claims. For more details on remote branding and customization of a mobile device, see U.S. patent application Ser. No. 14/060,719, filed on Oct. 23, 2013, entitled "Implementation of Remotely Hosted Branding Content and Customizations," by Robert E. Urbanek which is incorporated by reference in its entirety.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
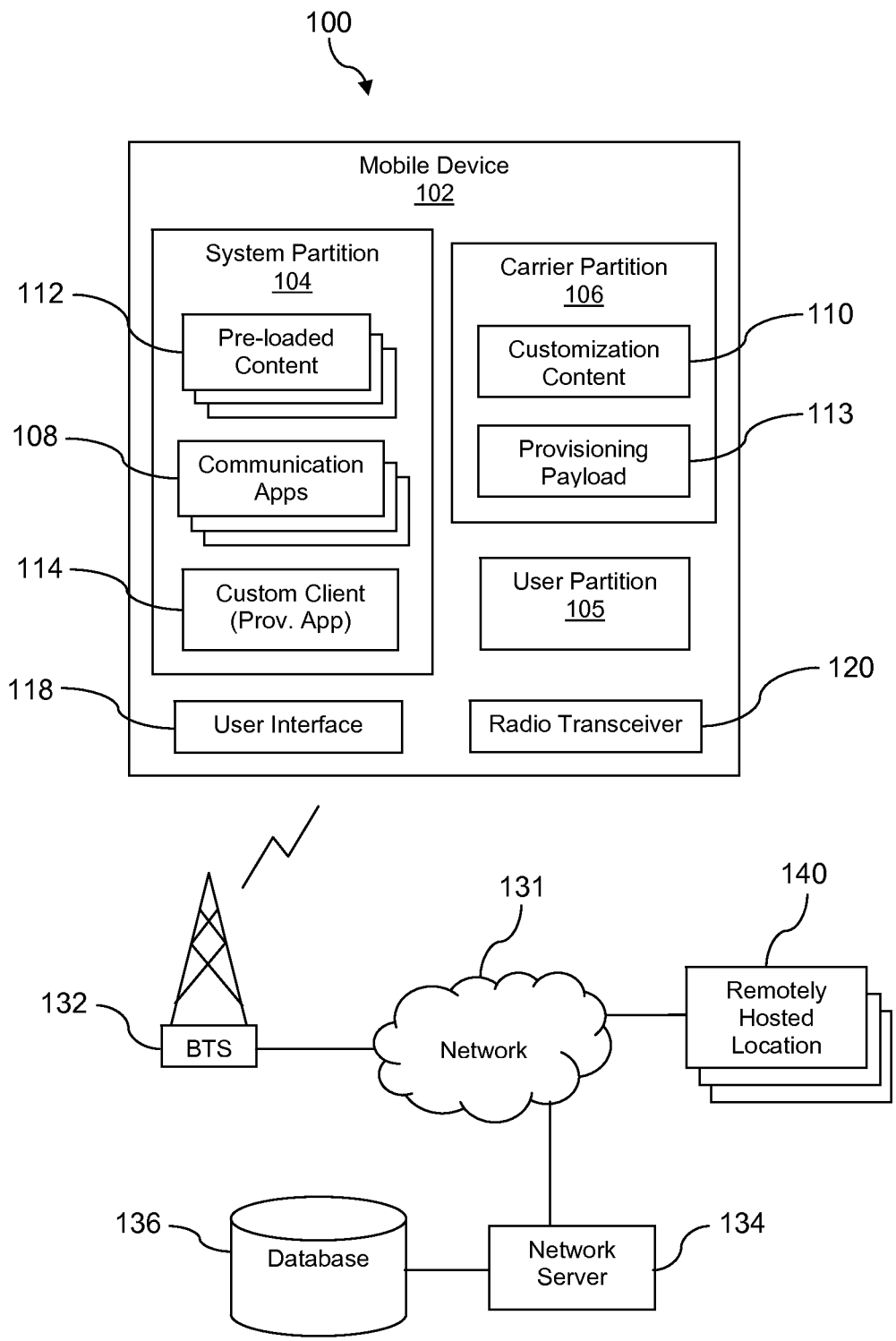
FIG. 1 is an illustration of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Embodiments of the disclosure are directed to methods and systems for provisioning and/or customizing a mobile device. After a mobile device is purchased by a user, custom settings and information (or customization content) may be delivered to or accessed on the mobile device. Customization content may include graphics, images, audio files, splash screens, opening screens, backgrounds, and tones.

Customization content may also include customer service numbers, messaging platforms, IP addresses and port numbers, client identification, and market catalogs. The customization content may be used to complete a provisioning and/or activation process on the mobile device, where the customization content may be installed, downloaded, and/or otherwise accessed during the provisioning process. In some cases, the provisioning and/or activation process may be completed by an application on the mobile device, such as a provisioning application or customization client. In some cases, the provisioning process may be initiated when a provisioning payload is delivered to the mobile device. The provisioning payload may comprise instructions for completing the provisioning process. An activation process may comprise prompting a user to perform a variety of activation steps such as inputting user preferences, transferring contacts from another mobile device, installing third party applications on the mobile device. The activation process may be performed after provisioning is completed, in the case that provisioning is conceived to focus on configuring the mobile device and the wireless service provider network to promote basic communications service for the mobile device. Alternatively, the provisioning process can be conceived to further comprise the steps characterized above as part of an activation process.

In some cases, the provisioning payload may include one or more file locator, and at least a portion of the customization content may be accessed by referencing the file locator. By accessing customization content via the file locator, the amount of content that is included in the provisioning payload, and therefore the size of the provisioning payload, may be reduced. Additionally, the transfer time of the provisioning payload may be reduced. In some cases, a portion of the customization content may be delivered to the mobile device in the provisioning payload, where the portion delivered with the payload may comprise small sized files or data.

In some cases, at least a portion of the customization content may be pre-loaded onto the device. The file locator delivered in the provisioning payload may reference or identify the pre-loaded customization content. In some cases, the file locator may comprise a uniform resource identifier (or URI) string, and the provisioning application may access the pre-loaded customization content based on the URI string. In some cases, the URI string may direct to only a portion of the pre-loaded customization content, where the pre-loaded content may include a plurality of sets of customization content, and each set of customization content may be associated with a different wireless service brand.

In some cases, the file locator may comprise a uniform resource locator (or URL) string, and the provisioning application may access customization content from a remotely hosted location based on the URL string. The customization content may be downloaded from the remotely hosted location to the mobile device, and then used to complete the provisioning process. In some cases, a portion of the customization content may be acquired from pre-loaded content, a portion of the customization content may be downloaded from a remotely hosted location, a portion of the customization content may be delivered in the provisioning payload, or any combination of the above.

In some cases the mobile device is suitable to be provisioned for use under multiple different brands, each of which may feature different brand-specific and/or customization content. For example, the brand content associated with each brand may comprise sets of content, at least some of which is different brand-to-brand. For example, a first brand may be associated with a first background theme, a first power-on splash screen, a first customer care number provisioned, and a first voice mail number provisioned; while a second brand may be associated with a second background theme, a second power-on splash screen, a second customer care number provisioned, and a second voice mail number provisioned. This is a simple example. In particular cases, the set of brand content may be more extensive.

Additionally, the device may access multiple sets of customization content based on a URL, wherein the sets of content are associated with different brands. In some cases, a mobile device may be capable of being associated with a second brand after the initial provisioning process has been completed. For example, a user may wish to use the same device, but with a different brand, carrier, or service, or the device may be returned and reset. In this case, the mobile device may complete a second provisioning process, wherein the customization content accessed during the second provisioning process may be different (or associated with a different brand) from the content accessed during the first provisioning process. In other words, the device may comprise multiple branding options (such as access to multiple sets of customization content), and in a first provisioning process, a first branding option may be chosen, and then in a second provisioning process, a second branding option may be chosen, etc.

The ability to readily and easily change the brand of the mobile communication device may promote a variety of desirable business objectives. For example, a large volume order of a single model of handset may be priced by the original equipment manufacturer with a volume discount, and later the models may be branded to three or more different brands. If the handsets had been branded by the original equipment manufacturer, they would likely have been treated as three different products and priced based on the purchase volume of each different product, possibly losing at least some of the volume discount. Additionally, devices may be rebranded at various stages in the lifecycle of the mobile device. For example, the user may return the phone to have a problem fixed under warranty. The repair center may ship a different physical device to the user and fix the failed phone. After fixing the failed phone, the phone may be rebranded to a different brand—for example a brand that is currently experiencing increased customer demand—and provided to a distribution center for resale. The innovations and methods of the present disclosure contribute to the ease and capability of performing such branding, rebranding, and customization activities.

The mobile communication device may have memory established as a system memory partition and a user memory partition. An operating system of the mobile communication device may restrict write access to the system memory partition and may prevent the contents of the system memory partition being erased during reset operations, for example resetting to factory defaults. For example, a user may be prevented from writing to the system memory partition and/or from causing writing to the system memory partition. By contrast, the operating system of the mobile communication device may allow unrestricted write access to the user memory partition. For example, a user of the mobile communication device may be permitted by the operating system to write information into the user memory partition, at least indirectly by exercising user interface control selections, for example entering personal contacts, installing third party applications, downloading ring tones, and the like. During a reset, for example during a reset to factory defaults, the information in the user memory partition may be deleted by the operating system. The ANDROID operating system used by some mobile communication devices may establish a system memory partition and a user memory partition.

The operating system may further provide write access to a carrier memory partition to privileged users or automated processes. For example, an individual providing a carrier memory partition key or password, for example an employee or contractor associated with a wireless communication service provider, may be allowed by the operating system to write to the carrier memory partition. Alternatively, instructions that execute on the mobile communication device may be granted the privilege to write to the carrier memory partition by the operating system based on the instructions providing the key or password. In an embodiment, the key or password is unavailable and unknown to a user of the mobile communication device, for example the key or password may only be known to the wireless service provider and/or carrier. In an embodiment, the instructions may invoke an application programming interface (API) provided by the operating system to write to the carrier memory partition, and the API call may entail providing the key or password associated with the carrier memory partition. In some contexts, this may be referred to as a carrier memory partition key or a carrier memory partition password. An automated procedure or function executed on the mobile communication device that presents a carrier memory partition key or password, for example a script wirelessly transmitted to the mobile communication device, may be permitted to write to the carrier memory partition. The carrier memory partition may be used to store branding information. The carrier memory partition further may be used to store other information unrelated to branding and/or customization content. For further details about carrier memory partitions, see U.S. patent application Ser. No. 13/763,428, filed Feb. 8, 2013, entitled "System and Method of Storing Service Brand Packages On a Mobile Device," by Brandon C. Annan, et al., which is hereby incorporated by reference in its entirety.

Turning now to FIG. 1, a communication system 100 is described. In an embodiment, the communication system 100 comprises a mobile device 102 comprising a cellular radio transceiver 120, a plurality of communication applications 108, and an optional user interface 118. The mobile device 102 may engage in a variety of communication exchanges. The mobile device 102 may comprise a variety of devices such as a mobile phone, a personal digital assistant (PDA), a media player, a laptop computer, a tablet computer, and other electronic devices having a macro cellular radio transceiver.

In an embodiment, the system 100 comprises a network 131. The network 131 may be a private network, a public network, or a combination thereof. The network 131 may promote voice communications and data communications. Portions of the network 131 may provide an IP Multimedia Subsystem (IMS) network. The mobile device 102 may couple to the network 131 by a variety of communication paths. The mobile device 102 may communicate with a base transceiver station (BTS) 132 via a wireless link according to any of a variety of wireless communications protocols, including but not limited to code division multiple access (CDMA), long-term evolution (LTE), worldwide interoperability for microwave access (WiMAX), global system for mobile communications (GSM), or other wireless communication protocol. In some embodiments, the mobile device 102 may communicate with the base transceiver station (BTS) 132 via the cellular radio transceiver 120 of the mobile device 102. The wireless link between the mobile device 102 and the base transceiver station 132 may couple the mobile device 102 to the network 131. Additionally, the base transceiver station 132 may also be known as a cell tower. In some embodiments, the network 131 may provide communication between the mobile device 102 and a network server 134, wherein the network server 134 may also communicate with a network database 136.

It is understood that the system 100 may comprise any number of mobile devices 102 and any number of base transceiver stations 132. The collectivity of base transceiver stations 132 may be said to comprise a radio access network, in that these base transceiver stations 132 may provide radio communication links to the mobile devices 102 to provide access to the network 131. The radio access network may be abstracted in different ways and may comprise, in addition to the base transceiver stations 132, servers and data stores such as home location registers (HLRs) or servers that implement the functionality of home location registers, visitor location registers (VLRs) or servers that implement the functionality of visitor location registers, base station controllers (BSCs), mobile switching centers (MSCs), and other network nodes that are specifically associated with providing wireless access and connectivity to the mobile devices 102.

The communication applications 108 may comprise a voice communication application, a data communication application, a web browser application, an email application, a short message system (SMS) or texting application, a multimedia message system (MMS) application, and other communication applications. The communication applications 108 may be standard communication applications that are delivered by an original equipment manufacturer (OEM) who assembles the mobile communication device 102. The communication applications 108 may be stored as firmware or software in a trusted memory area of the mobile communication device 102. The communication applications 108 may expose application programming interfaces (APIs) accessible to other applications to provide wireless communication functionality to the other applications.

The communication applications 108 may be any of a variety of applications. One of the communication applications 108 may be a telephone application that receives dialed digits and attempts to originate a voice call—for example a voice over IP (VoIP) call—to a called telephone. One of the communication applications 108 may be a web browser application that requests content from the network 131, for example by sending out a hypertext transport protocol (HTTP) message embedding a universal reference locator (URL). One of the communication applications 108 may be a media player that requests streaming or downloading media from the network 131. Many of the communication applications 108 may depend upon communication service provided by an IMS network to deliver their functionality to an end user of the mobile device 102. One of the communication applications 108 may comprise a mobile transaction interface, where a user may complete a purchase using the application, and secure information, such as credit card information, may be communicated through the application. In some embodiments, the communication applications 108 may be stored in a system memory partition 104 of the memory of the mobile device 102.

The user interface 118 of the mobile device 102 may, in some embodiments, comprise a display, an input system, a speaker system, and/or a microphone. In some embodiments, the display may comprise a screen, and the input system may comprise a keypad and/or a touch screen, for example. The speaker system may communicate audio (such as media, messages, ring tones or phone call audio) to a user of the mobile device 102. The microphone may receive voice and/or audio from a user and/or communicate audio to a user. In an embodiment, a user may utilize the user interface 118 to communicate with the mobile device 102, for example, to initiate the execution of one or more of the communication applications 108. Additionally, a user may receive communication from the mobile device 102 via the user interface 118, such as phone calls, text messages, messages, emails, contact information, caller identification, call history, internet access, etc. A user may additionally employ the user interface 118 for viewing and/or listening to media such as music, movies, shows, videos, photos, games etc.

In some embodiments, the mobile device 102 may comprise a memory system divided into one or more partitions. The partitions may include a system memory partition 104, a carrier memory partition 106, and a user memory partition 105. In some embodiments, content may be stored and/or executed in one or more of the partitions. In some embodiments, the content stored in the memory of the mobile device 102 may be associated with the manufacturer of the device, or may be content that is pre-loaded onto the device. In some embodiments, the term "pre-loaded" may describe content that is loaded to the device 102 before the device 102 is activated by a user. In some embodiments, the communication applications 108 may be stored in the system memory partition 104. Additionally, a customization client 114 (or provisioning application) may be stored and/or executed in the system memory partition 104, wherein the customization client 114 may be operable to complete customization or provisioning processes for the mobile device 102. In some embodiments, one or more of the memory locations may comprise non-volatile or persistent memory.

In some embodiments, pre-loaded content 112 may be downloaded to the mobile device 102, wherein the pre-loaded content 112 may comprise provisioning or customization content. In some embodiments, the pre-loaded content 112 may be downloaded to (or stored in) the system memory partition 104 of the mobile device 102. In some embodiments, the pre-loaded content 112 may be used by the mobile device 102 (or an application on the mobile device 102) to complete a provisioning or customization process. In some embodiments, the pre-loaded content 112 may comprise at least three sets of customization content, each set of customization content associated with a different wireless service brand. For example, each set of pre-loaded content 112 may comprise branding and customization information and settings for a specific wireless service brand, such as a Sprint service brand, a Boost Mobile service brand, and/or a Virgin Mobile service brand. In some embodiments, the pre-loaded content 112 may comprise at least one set of pre-loaded content 112 that comprises generic or wholesale branding and customization information. In some embodiments, the generic set of pre-loaded content 112 may be used if the mobile device 102 is branded by a mobile virtual network operator (MVNO). In some embodiments, the pre-loaded content 112 may comprise one or more of: graphics, images, audio files, splash screens, opening screen, backgrounds, and tones.

In some embodiments, a provisioning payload 113 may be delivered to the device 102 during the initial set-up of the device, or during a subsequent set-up procedure, such as if the device 102 is reset or returned to factory settings. The provisioning payload 113 may contain information and/or instructions for completing a provisioning process. In some embodiments, the provisioning payload 113 may be delivered in accordance with OMA DM (open mobile alliance device management) protocol or framework. In other words, the provisioning payload 113 may be delivered as an OMA DM payload. In some embodiments, the provisioning payload 113 may be stored in the carrier memory partition 106 of the mobile device 102. In some embodiments, at least a portion of the provisioning payload may be stored in a SIM (subscriber identity module) card or a SD (secure digital) card on the mobile device, wherein the SIM card or SD card may provide removable memory on the mobile device.

The provisioning payload 113 may communicate with the customization client 114, wherein the customization client 114 may use the data of the provisioning payload 113 to complete the provisioning process. In some embodiments, the provisioning payload 113 may comprise one or more file locator that directs to one or more of the pre-loaded content items 112. In some embodiments, the customization client 114 may access a portion of the pre-loaded content 112 based on the file locator. In some embodiments, the file locator may comprise a uniform resource identifier (or URI) string. In some embodiments, the file locator may direct to only one of the wireless service brands, wherein each set of pre-loaded content 112 may be associated with a different wireless service brand.

In some embodiments, it may be desired to store the customization content outside of the system memory partition 104, such as in the carrier memory partition 106 and/or the user memory partition 105. In some embodiments, a copy of the pre-loaded content 112 may be downloaded from the system memory partition 104 to the carrier memory partition 106, wherein the content may be stored as customization content 110. In some embodiments, the customization content 110 stored in the carrier memory partition 106 may persist if the mobile device 102 is returned to factory settings. In some embodiments, the customization content 110 may be stored in a SIM card or SD card on the mobile device. In some embodiments, if there is any unused pre-loaded content 112 on the device 102 after the provisioning process has been completed, some or all of the unused content may be removed from the device 102. In other embodiments, the pre-loaded content 112 may persist in the system memory partition 104 whether or not it is accessed by the customization client 114.

In some embodiments, the provisioning payload 113 may comprise customization content, wherein the customization content is delivered over the air or over the wire with the provisioning payload 113. In some embodiments, the content delivered in the provisioning payload 113 may be stored in the carrier memory partition 106 as customization content 110. In other embodiments, the customization content delivered with the provisioning payload may be stored in a SIM card or SD card on the mobile device. In some embodiments, the customization content 110 stored in the carrier memory partition 106 may persist if the mobile device 102 is returned to factory settings. In some embodiments, the customization content delivered in the provisioning payload 113 may only comprise a portion of the total content need to complete the provisioning process. For example, the provisioning payload 113 may only contain smaller sized files of customization content 110 (such as approximately 256 bytes or less), and the provisioning payload 113 may also comprise a file locator for the remaining customization content 110, which may be pre-loaded content 112 on the device 102. In some embodiments, the customization content 110 delivered with the provisioning payload 113 may comprise one or more of: customer service number, messaging platform, IP address and port number, client identification, and market catalogs.

In some embodiments, the provisioning payload 113 may comprise one or more file locator, wherein at least one file locator may be a uniform resource locator (or URL) string. In some embodiments, the URL string may direct to a remotely hosted location 140, wherein the mobile device 102 may access the remotely host location 140 over-the-air (or via the network 131). During the execution of the provisioning process by the customization client 114, the device 102 may access the remotely hosted location 140 based on the file locator (or URL string). In some embodiments, the remotely hosted location 140 may provide customization content 110, which may be downloaded to the device 102 via the network 131. In some embodiments, the download of the customization content 110 may be completed incrementally, wherein the content to be downloaded may be prioritized and downloaded in priority order. In other embodiments, the customization content 110 may be downloaded all at once, or in one transaction. In some embodiments, the remotely hosted location 140 may be provided or hosted by a third party (separate from the service provider and/or the manufacturer of the device 102), wherein branding or customization content specific to the third party may be provided in the downloaded customization content 110.

In some embodiments, the provisioning payload 113 may comprise temporary customization content. In some embodiments, the temporary customization content may comprise one or more placeholder, wherein the placeholder(s) may be replaced during the provisioning process by customization content 110 directed to by a file locator (as described above). The file locator may be a URI string directing to pre-loaded content 112, the file locator may be a URL string directing to a remotely hosted location 140, or a combination of URI and URL strings may be used to acquire the customization content 110.

In some embodiments, downloading customization content 110 from the remotely hosted location 140 may be completed incrementally. For example, the content to be downloaded to the device 102 may be prioritized by importance for completing the provisioning process, and if the content cannot all be downloaded at the same time, the content may be downloaded in priority order. For example, the device 102 may have a weak or roaming connection to the network 131 when the download is initiated, which may hinder the download of the complete content. In some embodiments, the download of content to the device 102 may be partially completed and then postponed until the device has a better connection with the network 131 before being completed. In other embodiments, the download of the customization content 110 may be delayed until a better connection is acquired. In some embodiments, placeholder content may be used on the device 102 before the download is completed, wherein the placeholder content may be already loaded onto the device, may be delivered in the provisioning payload 113, or may be downloaded to the device 102. In some embodiments, the user may not be charged or billed for data used to download the provisioning payload 113 and/or the customization content 110 from the remotely hosted location 140.

In some embodiments, all of the customization content 110 used to complete the provisioning process may be provided by the pre-loaded content 112. In other embodiments, all of the customization content 110 used to complete the provisioning process may be downloaded from the remotely hosted location 140. In other embodiments, a portion of the customization content 110 used to complete the provisioning process may be downloaded from the remotely hosted location 140, and another portion of the customization content may be delivered to the device 102 with the provisioning payload 113. In other embodiments, a portion of the customization content 110 used to complete the provisioning process may be provided by the pre-loaded content 112, and another portion of the customization content may be delivered to the device 102 with the provisioning payload 113. In yet other embodiments, a portion of the customization content used to complete the provisioning process may be downloaded from the remotely hosted location 140, and another portion of the customization content may be provided by pre-loaded content 112.

Figure 2:
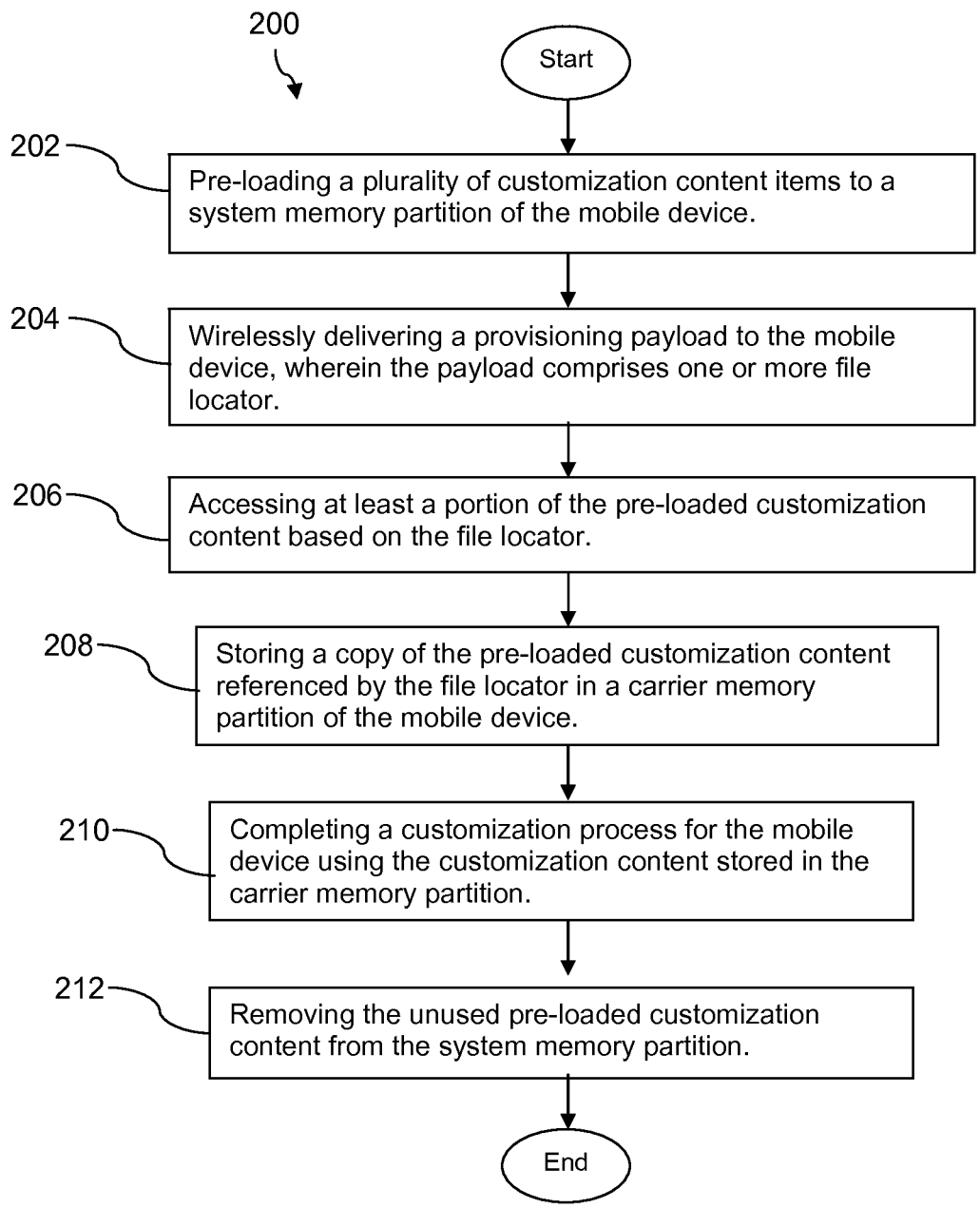
FIG. 2 is a flow chart illustrating a method according to an embodiment of the disclosure.

Turning now to FIG. 2, a method 200 for provisioning a mobile device is described. The method 200 comprises, at block 202, pre-loading a plurality of customization content items to a system memory partition of the mobile device. In some embodiments, the pre-loaded customization content may comprise one or more of: graphics, images, audio files, splash screens, opening screen, backgrounds, and tones. At block 204, the method 200 comprises wirelessly delivering a provisioning payload to the mobile device, wherein the payload may comprise one or more file locator. In some embodiments, the file locator may comprise a uniform resource identifier (URI) string. At block 206, the method 200 comprises accessing at least a portion of the pre-loaded customization content based on the file locator.

At block 208, the method 200 comprises storing a copy of the pre-loaded customization content referenced by the file locator in a carrier memory partition of the mobile device. At block 210, the method 200 comprises completing a customization process for the mobile device using the customization content stored in the carrier memory partition. In some embodiments, the steps of following the file locator, storing a copy of the content, and completing the customization process may be completed by a customization client on the mobile device. In some embodiments, the pre-loaded customization content may comprise at least three sets of customization content, wherein each set of customization content is associated with a different wireless service brand, and the file locator directs to only one of the sets of customization content, for example to customization content associated with only one of the wireless service brands. In some embodiments, the method 200 may optionally comprise, at block 212, removing the unused pre-loaded customization content from the system memory partition.

In some embodiments, a portion of the total customization content may be delivered in the provisioning payload, wherein the portion of the customization content delivered in the provisioning payload may comprise one or more of: customer service number, messaging platform, IP address and port number, client identification, and market catalogs. In other embodiments, the total customization content may be pre-loaded onto the mobile device and referenced by the file locator. In some embodiments, the size of the provisioning payload may be reduced because at least some of the customization content is pre-loaded on the mobile device.

Figure 3:
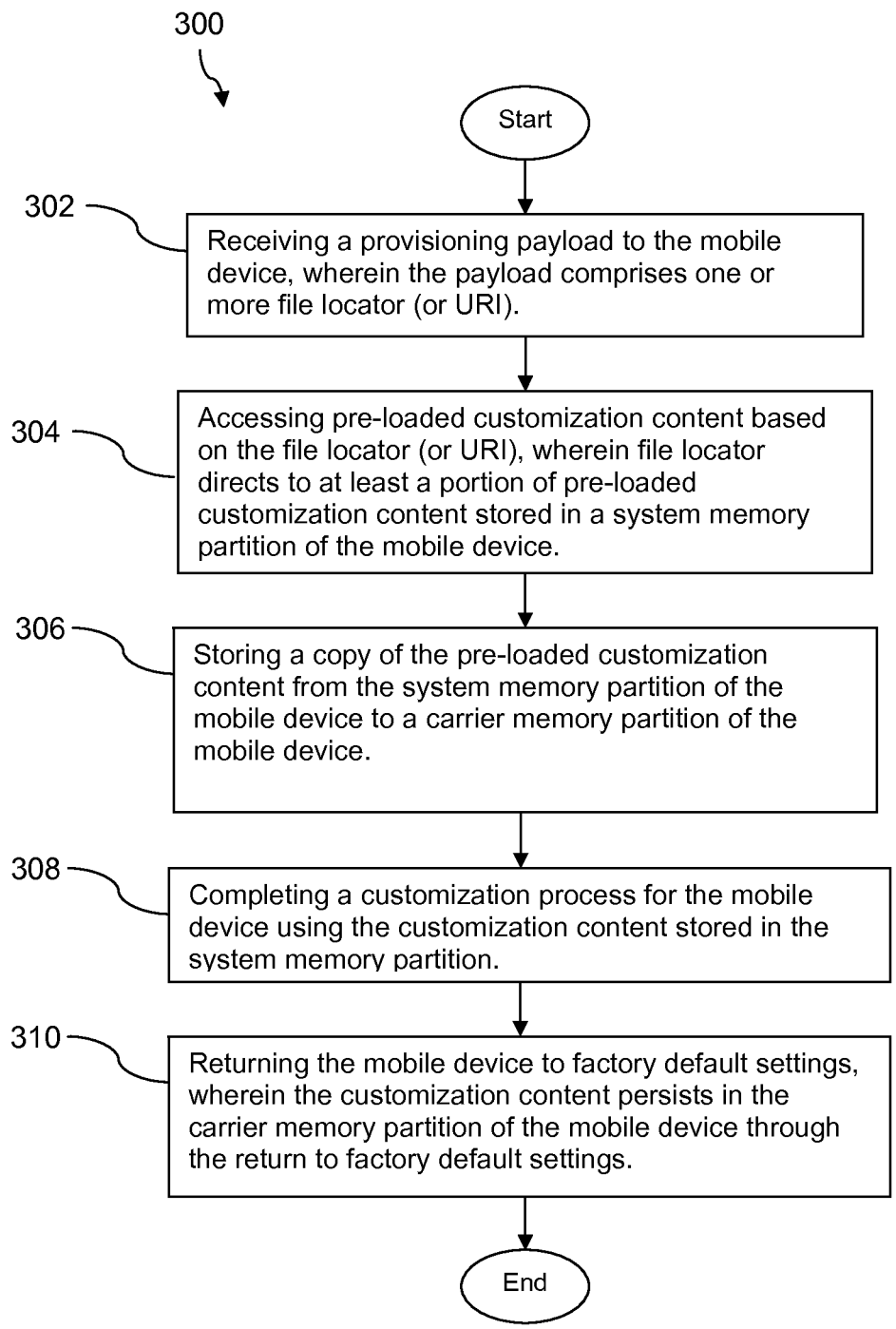
FIG. 3 is a flow chart illustrating another method according to an embodiment of the disclosure.

Turning now to FIG. 3, a method 300 for customizing a mobile device is described. The method 300 comprises, at block 302, wirelessly receiving a provisioning payload on the mobile device, wherein the payload comprises one or more file locator. In some embodiments, the file locator may comprise a uniform resource identifier (URI) string. At block 304, the method 300 may comprise accessing pre-loaded customization content based on the file locator (or URI string), wherein file locator directs to at least a portion of pre-loaded customization content stored in a system memory partition of the mobile device. At block 306, the method 300 may optionally comprise storing a copy of the pre-loaded customization content from the system memory partition of the mobile device to a carrier memory partition of the mobile device.

At block 308, the method 300 may comprise completing a customization process for the mobile device using the customization content stored in the system memory partition. In some embodiments, the method 300 may optionally comprise, at block 310, returning the mobile device to factory default settings, wherein the customization content persists in the carrier memory partition of the mobile device through the return to factory default settings. In some embodiments, a portion of the total customization content may be delivered in the provisioning payload. In some embodiments, the customization process is completed by a provisioning application on the mobile device. In some embodiments, the file locator may comprise one of a uniform resource identifier (URI) string or a uniform resource locator (URL) string. In some embodiments, the customization content may be brand or enterprise specific.

Figure 4:
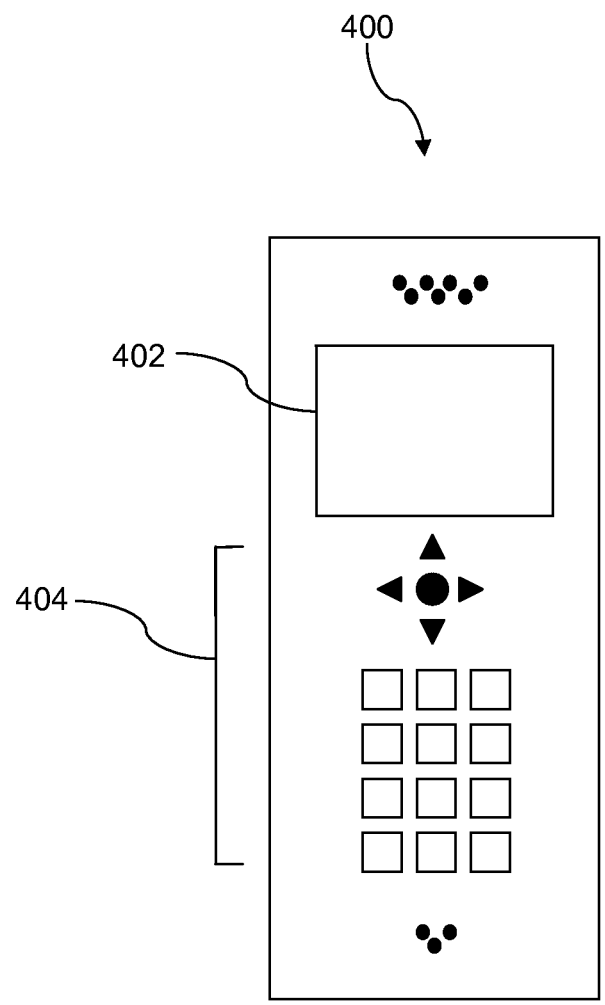
FIG. 4 is an illustration of a mobile communication device according to an embodiment of the disclosure.

FIG. 4 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 5:
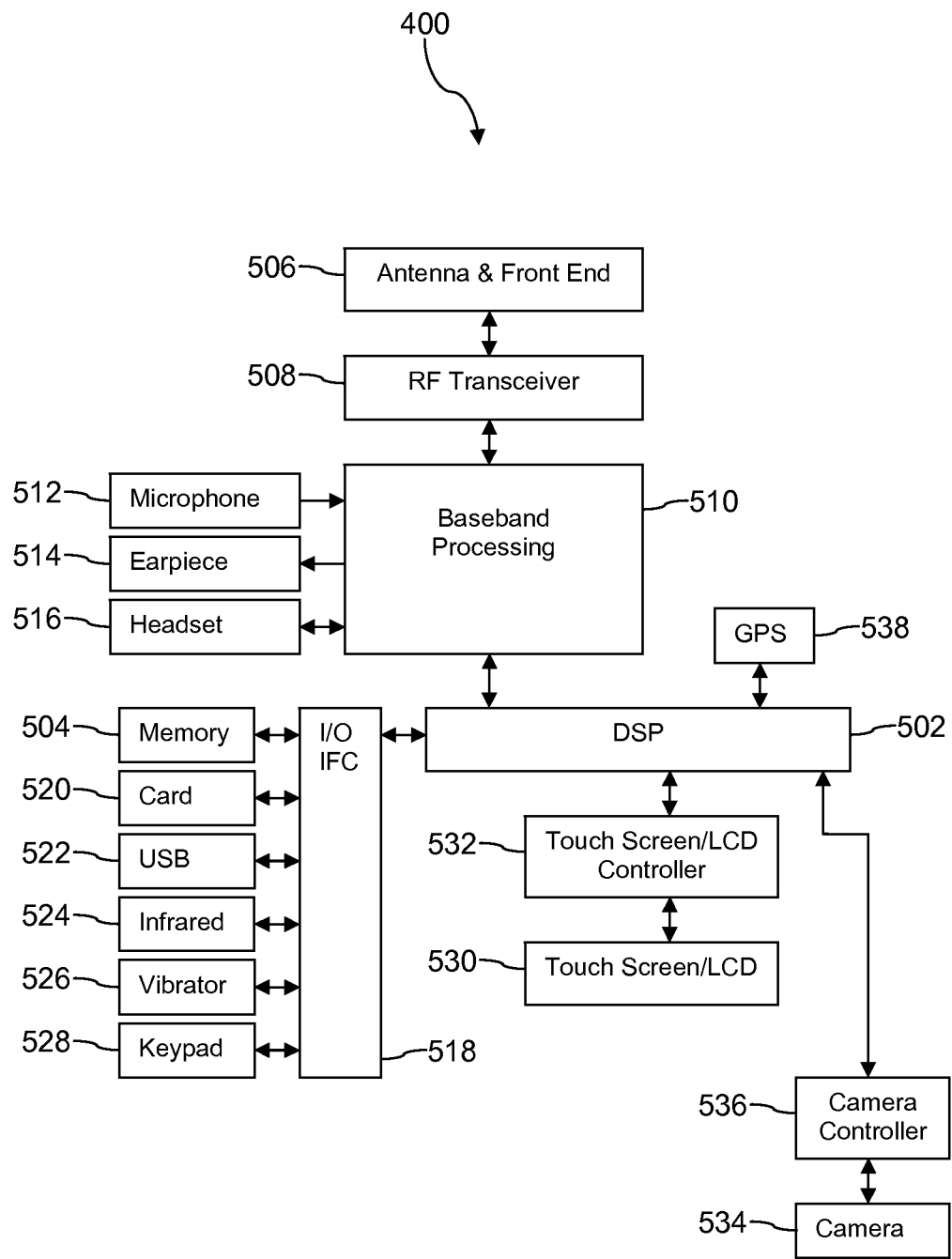
FIG. 5 is a block diagram of a mobile communication device according to an embodiment of the disclosure.

FIG. 5 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations.

The keypad 528 couples to the DSP 502 via the interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 6A:
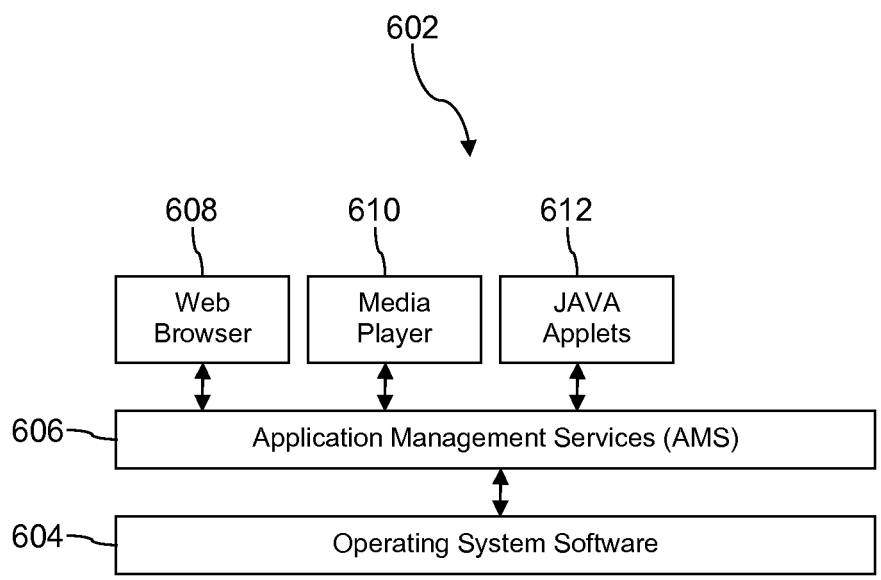
FIG. 6A is a block diagram of a software architecture of a mobile communication device according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 6A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

Figure 6B:
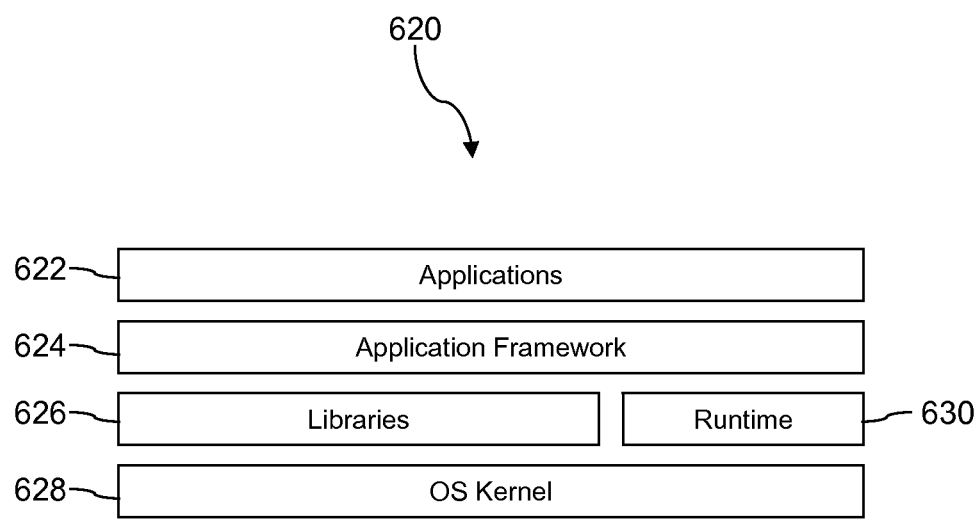
FIG. 6B is a block diagram of another software architecture of a mobile communication device according to an embodiment of the disclosure.

FIG. 6B illustrates an alternative software environment 620 that may be implemented by the DSP 502. The DSP 502 executes operating system software 628 (for example an operating system kernel) and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
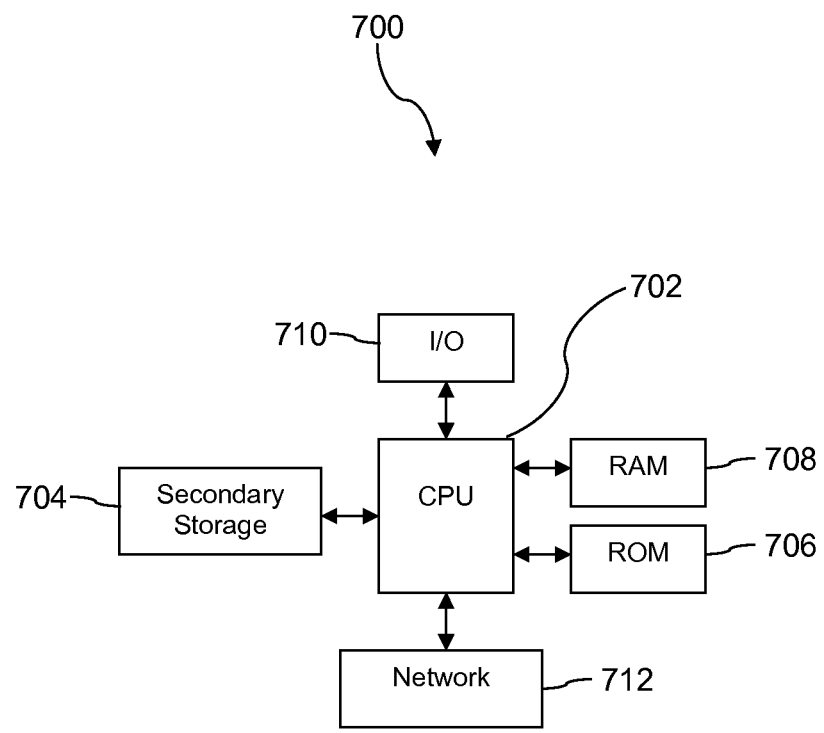
FIG. 7 illustrates an exemplary computer system suitable for implementing the several embodiments of the disclosure.

FIG. 7 illustrates a computer system 700 suitable for implementing one or more embodiments disclosed herein. The computer system 700 includes a processor 702 (which may be referred to as a central processor unit or CPU) that is in communication with memory devices including secondary storage 704, read only memory (ROM) 706, random access memory (RAM) 708, input/output (I/O) devices 710, and network connectivity devices 712. The processor 702 may be implemented as one or more CPU chips.

It is understood that by programming and/or loading executable instructions onto the computer system 700, at least one of the CPU 702, the RAM 708, and the ROM 706 are changed, transforming the computer system 700 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 704 is typically comprised of one or more disk drives or tape drives and is used for non-volatile storage of data and as an over-flow data storage device if RAM 708 is not large enough to hold all working data. Secondary storage 704 may be used to store programs which are loaded into RAM 708 when such programs are selected for execution. The ROM 706 is used to store instructions and perhaps data which are read during program execution. ROM 706 is a non-volatile memory device which typically has a small memory capacity relative to the larger memory capacity of secondary storage 704. The RAM 708 is used to store volatile data and perhaps to store instructions. Access to both ROM 706 and RAM 708 is typically faster than to secondary storage 704. The secondary storage 704, the RAM 708, and/or the ROM 706 may be referred to in some contexts as computer readable storage media and/or non-transitory computer readable media.

I/O devices 710 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 712 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 712 may enable the processor 702 to communicate with the Internet or one or more intranets. With such a network connection, it is contemplated that the processor 702 might receive information from the network, or might output information to the network in the course of performing the above-described method steps. Such information, which is often represented as a sequence of instructions to be executed using processor 702, may be received from and outputted to the network, for example, in the form of a computer data signal embodied in a carrier wave.

Such information, which may include data or instructions to be executed using processor 702 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well known to one skilled in the art. The baseband signal and/or signal embodied in the carrier wave may be referred to in some contexts as a transitory signal.

The processor 702 executes instructions, codes, computer programs, scripts which it accesses from hard disk, floppy disk, optical disk (these various disk based systems may all be considered secondary storage 704), ROM 706, RAM 708, or the network connectivity devices 712. While only one processor 702 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 704, for example, hard drives, floppy disks, optical disks, and/or other device, the ROM 706, and/or the RAM 708 may be referred to in some contexts as non-transitory instructions and/or non-transitory information.

In an embodiment, the computer system 700 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 700 to provide the functionality of a number of servers that is not directly bound to the number of computers in the computer system 700. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 700, at least portions of the contents of the computer program product to the secondary storage 704, to the ROM 706, to the RAM 708, and/or to other non-volatile memory and volatile memory of the computer system 700. The processor 702 may process the executable instructions and/or data structures in part by directly accessing the computer program product, for example by reading from a CD-ROM disk inserted into a disk drive peripheral of the computer system 700. Alternatively, the processor 702 may process the executable instructions and/or data structures by remotely accessing the computer program product, for example by downloading the executable instructions and/or data structures from a remote server through the network connectivity devices 712. The computer program product may comprise instructions that promote the loading and/or copying of data, data structures, files, and/or executable instructions to the secondary storage 704, to the ROM 706, to the RAM 708, and/or to other non-volatile memory and volatile memory of the computer system 700.

In some contexts, the secondary storage 704, the ROM 706, and the RAM 708 may be referred to as a non-transitory computer readable medium or a computer readable storage media. A dynamic RAM embodiment of the RAM 708, likewise, may be referred to as a non-transitory computer readable medium in that while the dynamic RAM receives electrical power and is operated in accordance with its design, for example during a period of time during which the computer system 700 is turned on and operational, the dynamic RAM stores information that is written to it. Similarly, the processor 702 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for provisioning a mobile device comprising:
   wirelessly receiving, by an application stored in a non-transitory memory of a mobile device and executable by a processor of the mobile device, a provisioning payload comprising an internal uniform resource identifier (URI) string, wherein the mobile device comprises at least some customization content pre-loaded to a system memory partition of the mobile device;
   accessing, by the application, at least a portion of the pre-loaded customization content from the system memory partition of the mobile device based on the internal URI string, wherein the at least the portion of the pre-loaded customization content referenced by the internal URI string comprises branding content associated with a wireless service brand, and wherein the branding content comprises one or more of a graphic, an image, an audio file, a splash screen, an opening screen, a background, or ring tone for the wireless services brand;
   providing, via an application programming interface (API) call of an API provided by an operating system of the mobile device, a carrier memory partition key or a carrier memory partition password to the operating system of the mobile device to permit writing to the carrier memory partition;
   in response to the operating system being provided the carrier memory partition key or the carrier memory partition password from the API call, writing, via execution of instructions that invoke the API, at least the portion of the pre-loaded customization content referenced by the internal URI string to the carrier memory partition of the mobile device; and
   completing, by the application, a customization process for the mobile device using the at least the portion of the pre-loaded customization content written to the carrier memory partition, wherein the customization process brands the mobile device with the branding content associated with the wireless service brand.

2. The method of claim 1, wherein the application comprises a customization client.

3. The method of claim 1, wherein the pre-loaded customization content comprises at least three sets of customization content, wherein each set of customization content is associated with a different wireless service brand, and wherein the internal URI string directs to only one of the at least three sets of customization content.

4. The method of claim 3, further comprising removing the non-accessed pre-loaded customization content from the system memory partition.

5. The method of claim 1, wherein at least some customization content is delivered in the provisioning payload.

6. The method of claim 5, wherein the at least some customization content delivered in the provisioning payload comprises one or more of: customer service number, messaging platform, IP address and port number, client identification, and market catalogs.

7. The method of claim 1, wherein all of the customization content is pre-loaded onto the mobile device and referenced by the internal URI string.

8. The method of claim 1, wherein the size of the provisioning payload is reduced because at least some of the customization content is pre-loaded on the mobile device.

9. A method for customizing a mobile device comprising:
during an initial set-up of the mobile device, wirelessly receiving, by an application stored in a non-transitory memory of a mobile device and executable by a processor of the mobile device, a provisioning payload comprising an internal uniform resource identifier (URI) string;
accessing, by the application, at least a portion of pre-loaded customization content from a system memory partition of the mobile device based on the internal URI string, wherein the at least the portion of the pre-loaded customization content referenced by the internal URI string comprises branding content associated with a wireless service brand, and wherein the branding content comprises one or more of a graphic, an image, an audio file, a splash screen, an opening screen, a background, or a ring tone for the wireless services brand;
providing, via an application programming interface (API) call of an API provided by an operating system of the mobile device, a carrier memory partition key or a carrier memory partition password to the operating system of the mobile device to permit writing to a carrier memory partition on the mobile device;
in response to the operating system being provided the carrier memory partition key or the carrier memory partition password from the API call, writing, via execution of instructions that invoke the API, at least the portion of the pre-loaded customization content referenced by the internal URI string to the carrier memory partition of the mobile device; and
completing, by the application, a customization process for the mobile device using the at least the portion of the pre-loaded customization content stored in written to the carrier memory partition, wherein the customization process brands the mobile device with the branding content associated with the wireless service brand.

10. The method of claim 9, further comprising subsequent to completing the customization process, returning the mobile device to factory default settings, wherein the at least the portion of the pre-loaded customization content persists in the carrier memory partition of the mobile device through the return to factory default settings.

11. The method of claim 9, wherein at least some customization content is delivered in the provisioning payload.

12. The method of claim 9, wherein all of the customization content used in the customization process is pre-loaded onto the mobile device.

13. The method of claim 9, wherein the application comprises a provisioning application.

14. A method for customizing a mobile device comprising:
wirelessly receiving, by an application stored in a non-transitory memory of a mobile device and executed by a processor of the mobile communication device, a provisioning payload comprising customization content and an internal uniform resource identifier (URI) string;
storing, by the application, the customization content in a system memory partition on the mobile device;
accessing, by the application, additional customization content from the system memory partition on the mobile device based on the internal URI string, wherein the additional customization content referenced by the internal URI string is pre-loaded onto the system memory partition and the additional customization content comprises branding content associated with a wireless service brand, and wherein the branding content comprises one or more of a graphic, an image, an audio file, a splash screen, an opening screen, a background, or a ring tone for the wireless services brand;
providing, via an application programming interface (API) call of an API provided by an operating system of the mobile device, a carrier memory partition key or a carrier memory partition password to the operating system of the mobile device to permit writing to a carrier memory partition on the mobile device; in response to the operating system being provided the carrier memory partition key or the carrier memory partition password from the API call, writing, via execution of instructions that invoke the API, the additional customization content referenced by the internal URI string to the carrier memory partition of the mobile device; and
completing, by the application, a customization process for the mobile device using the customization content stored in the system memory partition and the additional customization content written to the carrier memory partition, wherein the customization process brands the mobile device with the branding content associated with the wireless service brand.

15. The method of claim 14, wherein the provisioning payload further comprises a uniform resource locator string.

* * * * *